United States Patent
Munroe et al.

(10) Patent No.: US 12,510,539 B2
(45) Date of Patent: Dec. 30, 2025

(54) BIOMARKERS FOR A SYSTEMIC LUPUS ERYTHEMATOSUS (SLE) DISEASE ACTIVITY IMMUNE INDEX THAT CHARACTERIZES DISEASE ACTIVITY

(71) Applicants: Progentec Diagnostics, Inc., Oklahoma City, OK (US); Oklahoma Medical Research Foundation, Oklahoma City, OK (US)

(72) Inventors: Melissa Munroe, Oklahoma City, OK (US); Judith James, Oklahoma City, OK (US); Eldon Jupe, Oklahoma City, OK (US); Mohan Purushothaman, Oklahoma City, OK (US)

(*) Notice: Subject to any disclaimer, the term of this patent is extended or adjusted under 35 U.S.C. 154(b) by 1048 days.

(21) Appl. No.: 17/411,724

(22) Filed: Aug. 25, 2021

(65) Prior Publication Data

US 2021/0396751 A1 Dec. 23, 2021

Related U.S. Application Data

(63) Continuation-in-part of application No. 17/286,221, filed as application No. PCT/US2019/052917 on Sep. 25, 2019, now abandoned.

(60) Provisional application No. 63/071,230, filed on Aug. 27, 2020, provisional application No. 62/747,455, filed on Oct. 18, 2018.

(51) Int. Cl.
*G01N 33/53* (2006.01)
*G01N 33/564* (2006.01)
*G01N 33/68* (2006.01)

(52) U.S. Cl.
CPC ....... *G01N 33/564* (2013.01); *G01N 33/6893* (2013.01); *G01N 2800/52* (2013.01); *G01N 2800/56* (2013.01)

(58) Field of Classification Search
None
See application file for complete search history.

(56) References Cited

U.S. PATENT DOCUMENTS

| | | |
|---|---|---|
| 3,817,837 A | 6/1974 | Rubenstein et al. |
| 3,850,752 A | 11/1974 | Schuurs et al. |
| 3,939,350 A | 2/1976 | Kronick et al. |
| 3,996,345 A | 12/1976 | Ullman et al. |
| 4,275,149 A | 6/1981 | Litman et al. |
| 4,277,437 A | 7/1981 | Maggio |
| 4,366,241 A | 12/1982 | Tom et al. |
| 4,683,195 A | 7/1987 | Mullis et al. |
| 4,683,202 A | 7/1987 | Mullis |
| 4,800,159 A | 1/1989 | Mullis et al. |
| 4,883,750 A | 11/1989 | Whiteley et al. |
| 5,242,974 A | 9/1993 | Holmes |
| 5,279,721 A | 1/1994 | Schmid |
| 5,384,261 A | 1/1995 | Winkler et al. |
| 5,405,783 A | 4/1995 | Pirrung et al. |
| 5,412,087 A | 5/1995 | McGall et al. |
| 5,424,186 A | 6/1995 | Fodor et al. |
| 5,429,807 A | 7/1995 | Matson et al. |
| 5,436,327 A | 7/1995 | Southern et al. |
| 5,445,934 A | 8/1995 | Fodor et al. |
| 5,472,672 A | 12/1995 | Brennan |
| 5,527,681 A | 6/1996 | Holmes |
| 5,529,756 A | 6/1996 | Brennan |
| 5,532,128 A | 7/1996 | Eggers et al. |
| 5,545,531 A | 8/1996 | Rava et al. |
| 5,554,501 A | 9/1996 | Coassin et al. |
| 5,556,752 A | 9/1996 | Lockhart et al. |
| 5,561,071 A | 10/1996 | Hollenberg et al. |
| 5,571,639 A | 11/1996 | Hubbell et al. |
| 5,593,839 A | 1/1997 | Hubbell et al. |

(Continued)

FOREIGN PATENT DOCUMENTS

| | | |
|---|---|---|
| EP | 0320308 A2 | 6/1989 |
| EP | 0364255 A2 | 4/1990 |
| GB | 2202328 A | 9/1988 |
| WO | WO-8909284 A1 | 10/1989 |
| WO | WO-9007641 A1 | 7/1990 |
| WO | WO-2018/140606 A1 | 8/2018 |

OTHER PUBLICATIONS

Cutolo et al., The Supplementary Therapeutic DMARD Role of Low-Dose Glucocorticoids in Rheumatoid Arthritis, utolo et al., The Supplementary Therapeutic DMARD Role of Low-Dose Glucocorticoids in Rheumatoid Arthritis, Arthritis Research and Therapy, 2014, 16(Suppl 2), 51, 1-6. (Year: 2014).*

(Continued)

*Primary Examiner* — Gary Counts
(74) *Attorney, Agent, or Firm* — Harness, Dickey & Pierce, P.L.C.

(57) ABSTRACT

A method for characterizing disease activity in a systemic lupus erythematosus patient (SLE), comprising obtaining a dataset associated with a blood, serum, plasma or urine sample from the patient, assessing the dataset for a presence or an amount of protein expression of at least one innate serum or plasma mediator, assessing the dataset for a presence or an amount of protein expression of at least one adaptive serum or plasma mediator biomarker, assessing the dataset for a presence or an amount of at least one chemokine/adhesion molecule biomarker, assessing the dataset for a presence or an amount of at least one soluble TNF superfamily biomarker, assessing the dataset for a presence or an amount of at least one inflammatory mediator biomarker, assessing the dataset for a presence or an amount at least one SLE-associated autoantibody specificity biomarker and calculating a Lupus Disease Activity Immune Index (LDAII) score.

18 Claims, 7 Drawing Sheets

(56) References Cited

U.S. PATENT DOCUMENTS

| | | | |
|---|---|---|---|
| 5,599,695 A | 2/1997 | Pease et al. | |
| 5,624,711 A | 4/1997 | Sundberg et al. | |
| 5,658,734 A | 8/1997 | Brock et al. | |
| 5,700,637 A | 12/1997 | Southern | |
| 5,840,873 A | 11/1998 | Nelson et al. | |
| 5,843,640 A | 12/1998 | Patterson et al. | |
| 5,843,650 A | 12/1998 | Segev | |
| 5,843,651 A | 12/1998 | Stimpson et al. | |
| 5,846,708 A | 12/1998 | Hollis et al. | |
| 5,846,709 A | 12/1998 | Segev | |
| 5,846,717 A | 12/1998 | Brow et al. | |
| 5,846,726 A | 12/1998 | Nadeau et al. | |
| 5,846,729 A | 12/1998 | Wu et al. | |
| 5,846,783 A | 12/1998 | Wu et al. | |
| 5,849,487 A | 12/1998 | Hase et al. | |
| 5,849,497 A | 12/1998 | Steinman | |
| 5,849,546 A | 12/1998 | Sousa et al. | |
| 5,849,547 A | 12/1998 | Cleuziat et al. | |
| 5,853,990 A | 12/1998 | Winger et al. | |
| 5,853,992 A | 12/1998 | Glazer et al. | |
| 5,853,993 A | 12/1998 | Dellinger et al. | |
| 5,856,092 A | 1/1999 | Dale et al. | |
| 5,858,652 A | 1/1999 | Laffler et al. | |
| 5,861,244 A | 1/1999 | Wang et al. | |
| 5,863,732 A | 1/1999 | Richards | |
| 5,863,753 A | 1/1999 | Haugland et al. | |
| 5,866,331 A | 2/1999 | Singer et al. | |
| 5,866,366 A | 2/1999 | Kallender | |
| 5,882,864 A | 3/1999 | An et al. | |
| 5,905,024 A | 5/1999 | Mirzabekov et al. | |
| 5,910,407 A | 6/1999 | Vogelstein et al. | |
| 5,912,124 A | 6/1999 | Kumar | |
| 5,912,145 A | 6/1999 | Stanley | |
| 5,912,148 A | 6/1999 | Eggerding | |
| 5,916,776 A | 6/1999 | Kumar | |
| 5,919,630 A | 7/1999 | Nadeau et al. | |
| 5,922,574 A | 7/1999 | Minter | |
| 5,925,517 A | 7/1999 | Tyagi et al. | |
| 5,928,862 A | 7/1999 | Morrison | |
| 5,928,869 A | 7/1999 | Nadeau et al. | |
| 5,928,905 A | 7/1999 | Stemmer et al. | |
| 5,928,906 A | 7/1999 | Koster et al. | |
| 5,929,227 A | 7/1999 | Glazer et al. | |
| 5,932,413 A | 8/1999 | Celebuski | |
| 5,932,451 A | 8/1999 | Wang et al. | |
| 5,935,791 A | 8/1999 | Nadeau et al. | |
| 5,935,825 A | 8/1999 | Nishimura et al. | |
| 5,939,291 A | 8/1999 | Loewy et al. | |
| 5,942,391 A | 8/1999 | Zhang et al. | |
| 6,004,755 A | 12/1999 | Wang | |
| 2007/0238094 A1 | 10/2007 | Chaussabel et al. | |
| 2015/0098940 A1* | 4/2015 | James | C12Q 1/6883 506/7 |
| 2016/0349256 A1 | 12/2016 | James et al. | |
| 2017/0247462 A1 | 8/2017 | Axtell | |
| 2018/0275145 A1 | 9/2018 | Axtell et al. | |
| 2018/0364229 A1 | 12/2018 | James et al. | |
| 2019/0390278 A1 | 12/2019 | James et al. | |
| 2020/0049705 A1 | 2/2020 | James et al. | |
| 2021/0349088 A1 | 11/2021 | James et al. | |
| 2021/0396751 A1 | 12/2021 | Munroe et al. | |
| 2022/0344002 A1 | 10/2022 | James et al. | |
| 2023/0266315 A1 | 8/2023 | James et al. | |
| 2023/0296628 A1 | 9/2023 | Axtell et al. | |
| 2024/0011983 A1 | 1/2024 | Munroe et al. | |

OTHER PUBLICATIONS

Bijlsma et al., Are Glucocorticoids DMARDs ?, Annals of the New York Academy of Sciences, 2006, 1069, 268-274. (Year: 2006).*
Harrison, Andrew, Disease-Modifying Anti-rheumatic Drugs (DMARDs) for Rheumatoid Arthritis: Benefits and Risks, 1999, 1-8. (Year: 1999).*
Aberle T, Bourn RL, Munroe ME, Chen H, Roberts VC, Guthridge JM, et al. Clinical and serological features distinguish patients with incomplete lupus classification from systemic lupus erythematosus patients and controls. Arthritis care & research. 2017.
Al Sawah S, Zhang X, Zhu B, Magder LS, Foster SA, Iikuni N, et al. Effect of corticosteroid use by dose on the risk of developing organ damage over time in systemic lupus erythematosus—the Hopkins Lupus Cohort. Lupus science & medicine. 2015;2(I):e000066.
Al-Lamki RS, Mayadas TN. TNF receptors: signaling pathways and contribution to renal dysfunction. Kidney Int. 2015;87(2):281-96.
Alarcon GS, McGwin G, Jr., Petri M, Ramsey-Goldman R, Fessler BJ, Vila LM, et al. Time to renal disease and end-stage renal disease in PROFILE: a multiethnic lupus cohort. PLoS Med. 2006;3(10):e396.
Arbuckle MR, McClain MT, Rubertone MV, Scofield RH, Dennis GJ, James JA, et al. Development of autoantibodies before the clinical onset of systemic lupus erythematosus. N Engl J Med. 2003;349(16): 1526-33.
Arriens C, Wren JD, Munroe ME, Mohan C. Systemic lupus erythematosus biomarkers: the challenging quest. Rheumatology (Oxford). 2016.
Atfy M, Amr GE, Elnaggar AM, Labib HA, Esh A, Elokely AM. Impact of CD4+CD25high regulatory T-cells and FoxP3 expression in the peripheral blood of patients with systemic lupus erythematosus. The Egyptian journal of immunology / Egyptian Association of Immunologists. 2009; 16(1): 117-26.
Barral PM, Sarkar D, Su ZZ, Barber GN, DeSalle R, Racaniello VR, et al. Functions of the cytoplasmic RNA sensors RIG-I and MDA-5: key regulators of innate immunity. Pharmacol Ther. 2009;124(2):219-34.
Barreto M, Ferreira RC, Lourenco L, Moraes-Fontes MF, Santos E, Alves M, et al. Low frequency of CD4+CD25+ Treg in SLE patients: a heritable trait associated with CTLA4 and TGFbeta gene variants. BMC Immunol. 2009; 10:5.
Borchers AT, Leibushor N, Naguwa SM, Cheema GS, Shoenfeld Y, Gershwin ME. Lupus nephritis: a critical review. Autoimmun Rev. 2012; 12(2): 174-94.
Bruce IN, O'Keeffe AG, Farewell V, Hanly JG, Manzi S, Su L, et al. Factors associated with damage accrual in patients with systemic lupus erythematosus: results from the Systemic Lupus International Collaborating Clinics (SLICC) Inception Cohort. Ann Rheum Dis. 2015;74(9): 1706-13.
Bruner BF, Guthridge JM, Lu R, Vidal G, Kelly JA, Robertson JM, et al. Comparison of autoantibody specificities between traditional and bead-based assays in a large, diverse collection of patients with systemic lupus erythematosus and family members. Arthritis Rheum. 2012;64( 11):3677-86.
Carter NA, Rosser EC, Mauri C. Interleukin-10 produced by B cells is crucial for the suppression of Th17/Th1 responses, induction of T regulatory type 1 cells and reduction of collagen-induced arthritis. Arthritis Res Ther. 2012; 14(I):R32.
Chen Q, Kim YC, Laurence A, Punkosdy GA, Shevach EM. IL-2 controls the stability of Foxp3 expression in TGF-beta-induced Foxp3+ T cells in vivo. J Immunol. 2011; 186( 11):6329-37.
Chiche L, Jourde-Chiche N, Whalen E, Presnell S, Gersuk V, Dang K, et al. Modular transcriptional repertoire analyses of adults with systemic lupus erythematosus reveal distinct type I and type II interferon signatures. Arthritis & rheumatology. 2014;66(6): 1583-95.
Conti F, Ceccarelli F, Perricone C, Leccese I, Massaro L, Pacucci VA, et al. The chronic damage in systemic lupus erythematosus is driven by flares, glucocorticoids and antiphospholipid antibodies: results from a monocentric cohort. Lupus. 2016;25(7):719-26.
Crowe SR, Merrill JT, Vista ES, Dedeke AB, Thompson DM, Stewart S, et al. Influenza vaccination responses in human systemic lupus erythematosus: impact of clinical and demographic features. Arthritis Rheum. 2011;63(8):2396-406.
Davidson A. Targeting BAFF in autoimmunity. Curr Opin Immunol. 2010;22(6):732-9.
Day ES, Cachero TG, Qian F, Sun Y, Wen D, Pelletier M, et al. Selectivity of BAFF/BLyS and APRIL for binding to the TNF family receptors BAFFR/BR3 and BCMA. Biochemistry. 2005;44(6): 1919-31.

(56) References Cited

OTHER PUBLICATIONS

Doria A, Gatto M, Zen M, Iaccarino L, Punzi L. Optimizing outcome in SLE: treating-to-target and definition of treatment goals. Autoimmun Rev. 2014; 13(7): 770-7.

Dossus L, Becker S, Achaintre D, Kaaks R, Rinaldi S. Validity of multiplex-based assays for cytokine measurements in serum and plasma from "non-diseased" subjects: comparison with ELISA. J Immunol Methods. 2009;350(I-2): 125-32.

Dupont NC, Wang K, Wadhwa PD, Culhane JF, Nelson EL. Validation and comparison of luminex multiplex cytokine analysis kits with ELISA: determinations of a panel of nine cytokines in clinical sample culture supernatants. J Reprod Immunol. 2005;66(2): 175-91.

Durcan L, Petri M. Why targeted therapies are necessary for systemic lupus erythematosus. Lupus. 2016;25(10): 1070-9.

Eder L, Urowitz MB, Gladman DD. Damage in lupus patients-what have we learned so far? Lupus. 2013;22(12): 1225-31.

ELKoraie AF, Baddour NM, Adam AG, El Kashef EH, El Nahas AM. Role of stem cell factor and mast cells in the progression of chronic glomerulonephritides. Kidney Int. 2001 ;60(I): 167-72.

Faurschou M, Starklint H, Halberg P, Jacobsen S. Prognostic factors in lupus nephritis: diagnostic and therapeutic delay increases the risk of terminal renal failure. J Rheumatol. 2006;33(8): 1563-9.

Feldman CH, Hiraki LT, Liu J, Fischer MA, Solomon DH, Alarcon GS, et al. Epidemiology and sociodemographics of systemic lupus erythematosus and lupus nephritis among US adults with Medicaid coverage, 2000-2004. Arthritis Rheum. 2013;65(3):753-63.

Fujio K, Okamura T, Sumitomo S, Yamamoto K. Regulatory T cell-mediated control of autoantibody-induced inflammation. Frontiers in immunology. 2012;3:28.

Gomez D, Correa PA, Gomez LM, Cadena J, Molina JF, Anaya JM. Thl/Th2 cytokines in patients with systemic lupus erythematosus: is tumor necrosis factor alpha protective? Semin Arthritis Rheum. 2004;33(6):404-13.

Gordon C, Wofsy D, Wax S, Li Y, Pena Rossi C, Isenberg D. Post-hoc analysis of the Phase II/III APRIL-SLE study: Association between response to atacicept and serum biomarkers including BLyS and APRIL. Arthritis & rheumatology. 2017;69(1): 122-30.

Harigai M, Kawamoto M, Hara M, Kubota T, Kamatani N, Miyasaka N. Excessive production of IFN-gamma in patients with systemic lupus erythematosus and its contribution to induction of B lymphocyte stimulator/B cell-activating factor/TNF ligand superfamily-13B. J Immunol. 2008;181(3):2211-9.

Hay EM, Bacon PA, Gordon C, Isenberg DA, Maddison P, Snaith ML, et al. The BILAG index: a reliable and valid instrument for measuring clinical disease activity in systemic lupus erythematosus. Q J Med. 1993;86(7):447-58.

Hochberg MC. Updating the American College of Rheumatology revised criteria for the classification of systemic lupus erythematosus. Arthritis and Rheumatism. 1997;40(9): 1725.

Ibanez D, Gladman DD, Touma Z, Nikpour M, Urowitz MB. Optimal frequency of visits for patients with systemic lupus erythematosus to measure disease activity over time. J Rheumatol. 201 I;38(I):60-3, 2011.

International Search Report and Written Opinion for international application PCT/US2019/052917 dated Feb. 10, 2020.

Isenberg DA, Rahman A, Allen E, Farewell V, Akil M, Bruce IN, et al. BILAG 2004. Development and initial validation of an updated version of the British Isles Lupus Assessment Group's disease activity index for patients with systemic lupus erythematosus. Rheumatology (Oxford). 2005;44(7):902-6.

Kasitanon N, Intaniwet T, Wangkaew S, Pantana S, Sukitawut W, Louthrenoo W. The clinically quiescent phase in early-diagnosed SLE patients: inception cohort study. Rheumatology (Oxford). 2015;54(5):868-75.

Kawamoto M, Harigai M, Hara M, Kawaguchi Y, Tezuka K, Tanaka M, et al. Expression and function of inducible co-stimulator in patients with systemic lupus erythematosus: possible involvement in excessive interferon-gamma and anti-double-stranded DNA antibody production. Arthritis Res Ther. 2006;8(3):R62.

Kennedy WP, Maciuca R, Wolslegel K, Tew W, Abbas AR, Chaivorapol C, et al. Association of the interferon signature metric with serological disease manifestations but not global activity scores in multiple cohorts of patients with SLE. Lupus science & medicine. 2015;2(I):e000080.

Kheir JM, Guthridge CJ, Johnston JR, Adams LJ, Rasmussen A, Gross TF, et al. Unique clinical characteristics, autoantibodies and medication use in Native American patients with systemic lupus erythematosus. Lupus science & medicine. 2018;5(I):e000247.

Kim EY, Priatel JJ, Teh SJ, Teh HS. TNF receptor type 2 (p75) functions as a costimulator for antigen-driven T cell responses in vivo. J Immunol. 2006; 176(2): 1026-35.

Kim EY, Teh HS. TNF type 2 receptor (p75) lowers the threshold of T cell activation. J Immunol. 2001;167(12):6812-20.

Kim J, Gross JA, Dillon SR, Min JK, Elkon KB. Increased BCMA expression in lupus marks activated B cells, and BCMA receptor engagement enhances the response to TLR9 stimulation. Autoimmunity. 2011;44(2):69-81.

Kitoh T, Ishikawa H, Ishii T, Nakagawa S. Elevated SCF levels in the serum of patients with chronic renal failure. Br J Haematol. 1998; 102(5): 1151-6.

Ko K, Koldobskaya Y, Rosenzweig E, Niewold TB. Activation of the Interferon Pathway is Dependent Upon Autoantibodies in African-American SLE Patients, but Not in European-American SLE Patients. Frontiers in immunology. 2013;4:309.

Kurashina T, Nagasaka S, Watanabe N, Yabe D, Sugi N, Nin K, et al. Circulating TNF receptor 2 is closely associated with the kidney function in non-diabetic Japanese subjects. Journal of atherosclerosis and thrombosis. 2014;21(7):730-8.

Lam GK, Petri M. Assessment of systemic lupus erythematosus. Clin Exp Rheumatol. 2005;23(5 Suppl 39):S 120-32.

Lau CS, Mak A. The socioeconomic burden of SLE. Nat Rev Rheumatol. 2009;5(7):400-4.

Lee Y, Awasthi A, Yosef N, Quintana FJ, Xiao S, Peters A, et al. Induction and molecular signature of pathogenic TH17 cells. Nat Immunol. 2012; 13(10):991-9.

Lim SS, Bayakly AR, Helmick CG, Gordon C, Easley KA, Drenkard C. The incidence and prevalence of systemic lupus erythematosus, 2002-2004: The Georgia Lupus Registry. Arthritis & rheumatology. 2014;66(2):357-68.

Liu CC, Ahearn JM. The search for lupus biomarkers. Best practice & research Clinical rheumatology. 2009;23(4):507-23.

Llorente L, Zou W, Levy Y, Richaud-Patin Y, Wijdenes J, Alcocer-Varela J, et al. Role of interleukin 10 in the B lymphocyte hyper-activity and autoantibody production of human systemic lupus erythematosus. J Exp Med. 1995; 181 (3):839-44.

Lopez P, Scheel-Toellner D, Rodriguez-Carrio J, Caminal-Montero L, Gordon C, Suarez A. Interferon-alpha-induced B-lymphocyte stimulator expression and mobilization in healthy and systemic lupus erthymatosus monocytes. Rheumatology (Oxford). 2014;53(12):2249-58.

Lopez R, Davidson JE, Beeby MD, Egger PJ, Isenberg DA. Lupus disease activity and the risk of subsequent organ damage and mortality in a large lupus cohort. Rheumatology (Oxford). 2012;51(3):491-8.

Lu R, Munroe ME, Guthridge JM, Bean KM, Fife DA, Chen H, et al. Dysregulation of Innate and Adaptive Serum Mediators Precedes Systemic Lupus Erythematosus Classification and Improves Prognostic Accuracy of Autoantibodies J Autoimmun. 2016;74:182-93.

Manzi S, Sanchez-Guerrero J, Merrill JT, Furie R, Gladman D, Navarra SV, et al. Effects of belimumab, a B lymphocyte stimulator-specific inhibitor, on disease activity across multiple organ domains in patients with systemic lupus erythematosus: combined results from two phase III trials. Ann Rheum Dis. 2012;71( 11): 1833-8.

Maroz N, Segal MS. Lupus nephritis and end-stage kidney disease. The American journal of the medical sciences. 2013;346(4):319-23.

Mikdashi J, Nived O. Measuring disease activity in adults with systemic lupus erythematosus: the challenges of administrative burden and responsiveness to patient concerns in clinical research. Arthritis Res Ther. 2015; 17:183.

(56) References Cited

OTHER PUBLICATIONS

Mok CC, Ho LY, Cheung MY, Yu KL, To CH. Effect of disease activity and damage on quality of life in patients with systemic lupus erythematosus: a 2-year prospective study. Scand J Rheumatol. 2009;38(2): 121-7.

Mok MY, Wu HJ, Lo Y, Lau CS. The Relation of Interleukin 17 (IL-17) and IL-23 to Th1/Th2 Cytokines and Disease Activity in Systemic Lupus Erythematosus. J Rheumatol. 2010;37(10):2046-52.

Morel J, Roubille C, Planelles L, Rocha C, Fernandez L, Lukas C, et al. Serum levels of tumour necrosis factor family members a proliferation-inducing ligand (APRIL) and B lymphocyte stimulator (BLyS) are inversely correlated in systemic lupus erythematosus. Ann Rheum Dis. 2009;68(6):997-1002.

Mosca M, Tani C, Aringer M, Bombardieri S, Boumpas D, Cervera R, et al. Development of quality indicators to evaluate the monitoring of SLE patients in routine clinical practice. Autoimmun Rev. 2011; 10(7):383-8.

Munroe ME, Bishop GA. Role of tumor necrosis factor (TNF) receptor-associated factor 2 (TRAF2) in distinct and overlapping CD40 and TNF receptor 2/CD120b-mediated B lymphocyte activation. J Biol Chem. 2004;279(51):53222-31.

Munroe ME, Lu R, Zhao YD, Fife DA, Robertson JM, Guthridge JM, et al. Altered type II interferon precedes autoantibody accrual and elevated type I interferon activity prior to systemic lupus erythematosus classification. Ann Rheum Dis. 2016;75(I I):2014-21.

Munroe ME, Vista ES, Guthridge JM, Thompson LF, Merrill JT, James JA. Pro-inflammatory adaptive cytokines and shed tumor necrosis factor receptors are elevated preceding systemic lupus erythematosus disease flare. Arthritis & rheumatology. 2014;66(7): 1888-99.

Munroe ME, Vista ES, Merrill JT, Guthridge JM, Roberts VC, James JA. Pathways of impending disease flare in African-American systemic lupus erythematosus patients. J Autoimmun. 2017;78:70-8.

Munroe ME, Young KA, Kamen DL, Guthridge JM, Niewold TB, Costenbader KH, et al. Discerning Risk of Disease Transition in Relatives of Systemic Lupus Erythematosus Patients Utilizing Soluble Mediators and Clinical Features. Arthritis & rheumatology. 2017;69(3):630-42.

Munroe, ME et al. Innate, Adaptive, and TNF-Superfamily Immune Pathways Inform a Lupus Disease Activity Immune Index That Characterizes Disease Activity in SLE. Arthritis Rheumatology. Sep. 2018; 70 (suppl 10); pp. 1-2; abstract; https://acrabstracts.org/abstract/i nnate-ad ap tive-and-tnf-superfamilyi m mu ne-pathways-inform-alupus- disease-activity-immune-index-that-characterizes-diseaseactivity-in-sle/. Accessed Nov. 18, 2019.

Nalbandian A, Crispin JC, Tsokos GC. Interleukin-17 and systemic lupus erythematosus: current concepts. Clin Exp Immunol. 2009;157(2):209-15.

Ng KP, Manson JJ, Rahman A, Isenberg DA. Association of antinucleosome antibodies with disease flare in serologically active clinically quiescent patients with systemic lupus erythematosus. Arthritis Rheum. 2006;55(6):900-4.

Oglesby A, Korves C, Laliberte F, Dennis G, Rao S, Suthoff ED, et al. Impact of early versus late systemic lupus erythematosus diagnosis on clinical and economic outcomes. Appl Health Econ Health Policy. 2014; 12(2): 179-90.

Okamoto A, Fujio K, Okamura T, Yamamoto K. Regulatory T-cell-associated cytokines in systemic lupus erythematosus. J Biomed Biotechnol. 2011;2011:463412.

Parodis I, Zickert A, Sundelin B, Axelsson M, Gerhardsson J, Svenungsson E, et al. Evaluation of B lymphocyte stimulator and a proliferation inducing ligand as candidate biomarkers in lupus nephritis based on clinical and histopathological outcome following induction therapy. Lupus science & medicine. 2015;2(I):e000061.

Peschken CA, Wang Y, Abrahamowicz M, Pope J, Silverman E, Sayani A, et al. Persistent Disease Activity Remains a Burden for Patients with Systemic Lupus Erythematosus. J Rheumatol. 2018.

Petri M, Kim MY, Kalunian KC, Grossman J, Hahn BH, Sammaritano LR, et al. Combined oral contraceptives in women with systemic lupus erythematosus. N Engl J Med. 2005;353(24):2550-8.

Petri M, Purvey S, Fang H, Magder LS. Predictors of organ damage in systemic lupus erythematosus: the Hopkins Lupus Cohort. Arthritis Rheum. 2012;64(12):4021-8.

Petri MA, van Vollenhoven RF, Buyon J, Levy RA, Navarra SV, Cervera R, et al. Baseline Predictors of Systemic Lupus Erythematosus Flares: Data From the Combined Placebo Groups in the Phase III Belimumab Trials. Arthritis Rheum. 2013;65(8):2143-53.

Polachek A, Gladman DD, Su J, Urowitz MB. Defining Low Disease Activity in Systemic Lupus Erythematosus. Arthritis care & research. 2017;69(7):997-1003.

Roschke V, Sosnovtseva S, Ward CD, Hong JS, Smith R, Albert V, et al. BLyS and APRIL form biologically active heterotrimers that are expressed in patients with systemic immune- based rheumatic diseases. J Immunol. 2002; 169(8):4314-21.

Rose T, Grutzkau A, Hirseland H, Huscher D, Dahnrich C, Dzionek A, et al. IFNalpha and its response proteins, IP-10 and SIGLEC-1, are biomarkers of disease activity in systemic lupus erythematosus. Ann Rheum Dis. 2013;72(10): 1639-45.

Salazar-Camarena DC, Ortiz-Lazareno PC, Cruz A, Oregon-Romero E, Machado-Contreras JR, Munoz-Valle JF, et al. Association of BAFF, APRIL serum levels, BAFF-R, TACI and BCMA expression on peripheral B-cell subsets with clinical manifestations in systemic lupus erythematosus. Lupus. 2016;25(6):582-92.

Sarra M, Monteleone G. Interleukin-21: a new mediator of inflammation in systemic lupus erythematosus. J Biomed Biotechnol. 2010;2010:294582.

Schneider P. The role of APRIL and BAFF in lymphocyte activation. Curr Opin Immunol. 2005;17(3):282-9.

Shah K, Lee WW, Lee SH, Kim SH, Kang SW, Craft J, et al. Dysregulated balance of Th17 and Th1 cells in systemic lupus erythematosus. Arthritis Res Ther. 2010;12(2):R53.

Sheane BJ, Gladman DD, Su J, Urowitz MB. Disease Outcomes in Glucocorticosteroid-Naive Patients With Systemic Lupus Erythematosus. Arthritis care & research. 2017;69(2):252-6.

Sim JH, Kim HR, Chang SH, Kim IJ, Lipsky PE, Lee J. Autoregulatory function of interleukin-10-producing pre-naive B cells is defective in systemic lupus erythematosus. Arthritis Res Ther. 2015;17:190.

Slight-Webb S, Lu R, Ritterhouse LL, Munroe ME, Maecker HT, Fathman CG, et al. Autoantibody-Positive Healthy Individuals Display Unique Immune Profiles That May Regulate Autoimmunity. Arthritis & rheumatology. 2016;68(10):2492-502.

Somers EC, Marder W, Cagnoli P, Lewis EE, DeGuire P, Gordon C, et al. Population-based incidence and prevalence of systemic lupus erythematosus: the Michigan Lupus Epidemiology and Surveillance program. Arthritis & rheumatology. 2014;66(2):369-78.

Speeckaert MM, Speeckaert R, Laute M, Vanholder R, Delanghe JR. Tumor necrosis factor receptors: biology and therapeutic potential in kidney diseases. American journal of nephrology. 2012;36(3):261-70.

Steiman AJ, Gladman DD, Ibanez D, Urowitz MB. Prolonged serologically active clinically quiescent systemic lupus erythematosus: frequency and outcome. J Rheumatol. 2010;37(9): 1822-7.

Stohl W, Metyas S, Tan SM, Cheema GS, Oamar B, Roschke V, et al. Inverse association between circulating APRIL levels and serological and clinical disease activity in patients with systemic lupus erythematosus. Ann Rheum Dis. 2004;63(9): 1096-103.

Stringer EA, Baker KS, Carroll IR, Montoya JG, Chu L, Maecker HT, et al. Daily cytokine fluctuations, driven by leptin, are associated with fatigue severity in chronic fatigue syndrome: evidence of inflammatory pathology. Journal of translational medicine. 2013; 11 (1): 93.

Striz I, Brabcova E, Kolesar L, Sekerkova A. Cytokine networking of innate immunity cells: a potential target of therapy. Clinical science. 2014; 126(9):593-612.

Tai YT, Lin L, Xing L, Cho SF, Yu T, Acharya C, et al. APRIL signaling via TACI mediates immunosuppression by T regulatory cells in multiple myeloma: therapeutic implications. Leukemia. 2018.

(56) References Cited

OTHER PUBLICATIONS

Tan EM, Cohen AS, Fries JF, Masi AT, McShane DJ, Rothfield NF, et al. The 1982 revised criteria for the classification of systemic lupus erythematosus. Arthritis and Rheumatism. 1982;25(11): 1271-7.

Thamer M, Hernan MA, Zhang Y, Cotter D, Petri M. Prednisone, lupus activity, and permanent organ damage. J Rheumatol. 2009;36(3):560-4.

Thanou A, Chakravarty E, James JA, Merrill JT. Which outcome measures in SLE clinical trials best reflect medical judgment? Lupus science & medicine. 2014;I(I):e000005.

Thanou A, Stavrakis S, Dyer JW, Munroe ME, James JA, Merrill JT. Impact of heart rate variability, a marker for cardiac health, on lupus disease activity. Arthritis Res Ther. 2016; 18:197.

Thong B, Olsen NJ. Systemic lupus erythematosus diagnosis and management. Rheumatology (Oxford). 2017;56(suppl_I):i3-iI3.

Tokano Y, Morimoto S, Kaneko H, Amano H, Nozawa K, Takasaki Y, et al. Levels of IL-12 in the sera of patients with systemic lupus erythematosus (SLE)-relation to Th1- and Th2-derived cytokines. Clin Exp Immunol. 1999;116(1): 169-73.

Upadhyay A, Larson MG, Guo CY, Vasan RS, Lipinska I, O'Donnell CJ, et al. Inflammation, kidney function and albuminuria in the Framingham Offspring cohort. Nephrol Dial Transplant. 2011;26(3):920-6.

Villegas-Zambrano N, Martinez-Taboada VM, Bolivar A, San Martin M, Alvarez L, Marin MJ, et al. Correlation between clinical activity and serological markers in a wide cohort of patients with systemic lupus erythematosus: an eight-year prospective study. Ann N Y Acad Sci. 2009;I173:60-6.

Vincent FB, Morand EF, Schneider P, Mackay F. The BAFF/APRIL system in SLE pathogenesis. Nat Rev Rheumatol. 2014.

Wang D, Huang S, Yuan X, Liang J, Xu R, Yao G, et al. The regulation of the Treg/Th17 balance by mesenchymal stem cells in human systemic lupus erythematosus. Cellular & molecular immunology. 2017;14(5):423-31.

Ward MM, Sundaramurthy S, Lotstein D, Bush TM, Neuwelt CM, Street RL, Jr. Participatory patient-physician communication and morbidity in patients with systemic lupus erythematosus. Arthritis Rheum. 2003;49(6):810-8.

Zonana-Nacach A, Barr SG, Magder LS, Petri M. Damage in systemic lupus erythematosus and its association with corticosteroids. Arthritis Rheum. 2000;43(8): 1801-8.

Antibodies: A Laboratory Manual, Cold Spring Harbor Laboratory, 1988.

Ni, D. et al. "Immunoblotting and Immunodetection" Curr. Protoc. Immunol. 114:8.10.1-8.10.36. (2016).

\* cited by examiner

BIOMARKERS FOR A SYSTEMIC LUPUS ERYTHEMATOSUS (SLE) DISEASE ACTIVITY IMMUNE INDEX THAT CHARACTERIZES DISEASE ACTIVITY

CROSS-REFERENCE TO RELATED APPLICATIONS

This application claims the benefit of U.S. Provisional Application Ser. No. 63/071,230, filed Aug. 27, 2020 and entitled "Biomarkers For A Systemic Lupus Erythematosus (SLE) Disease Activity Immune Index That Characterizes Disease Activity" by Munroe, et al.

This application is also a continuation-in-part of U.S. application Ser. No. 17/286,221, filed Apr. 16, 2021 and entitled "Biomarkers For A Systemic Lupus Erythematosus (SLE) Disease Activity Immune Index That Characterizes Disease Activity" by James, et al., which is a national-stage entry of International Application No. PCT/US2019/052917, filed Sep. 25, 2019, which claims the benefit of U.S. Provisional Application Ser. No. 62/747,455.

GOVERNMENT LICENSE RIGHTS

This invention was made with government support under U54 GM104938, P30 AR073750, AI144292, and R44 AI142967 awarded by the National Institutes of Health. The government has certain rights in the invention.

TECHNICAL FIELD

The subject matter relates generally to the field of biomarkers for calculating a lupus disease activity immune index that characterizes disease activity in Systemic Lupus Erythematosus (SLE).

REFERENCE TO A SEQUENCE LISTING

Not applicable.

BACKGROUND

Without limiting the scope of the invention, its background is described in connection with Systemic Lupus Erythematosus (SLE).

Systemic autoimmune diseases, including SLE, afflict a significant proportion of the US population. Recent population-based studies reflect a prevalence of 73/100,000, while the Lupus Foundation of America estimates the number of possible SLE patients to be as high as 470/100,000 in routine clinical practice. SLE presents with a constellation of clinical symptoms; disease classification is contingent on meeting 4 of 11 American College of Rheumatology (ACR) criteria, 4 of 11 Systemic Lupus International Collaborating Clinics (SLICC) criteria, or ANA positivity ($\geq$1:80 titer by HEp-2 IIF assay), one clinical criterion and $\geq$10 points (from 7 clinical and 3 immunology domains) from the European League Against Rheumatism (EULAR)/ACR classification criteria for SLE Approximately 90% of patients are women, with most having disease onset between 15-45 years of age. Prevalence is higher in minority populations and with lower socioeconomic status. Persistently active clinical disease and its treatment place patients at risk for organ damage, including central nervous system, pulmonary, cardiovascular, and lupus nephritis, renal damage, and end-stage renal disease. Patients with waxing/waning disease and clinically active or quiescent disease are each at risk of clinical disease flare.

SLE is a clinically and serologically heterogeneous systemic autoimmune disease that causes significant morbidity and early mortality, especially in young women and minorities. Immune dysregulation in the form of pathogenic autoantibodies and chronic inflammation contributes to a wide range of clinical manifestations, listed above. A number of antinuclear autoantibody (ANA) specificities have been shown to accumulate in SLE patients; use of hydroxychloroquine may abrogate autoantibody accumulation and offset clinical disease activity. Early intervention is an attractive approach to SLE treatment. However, the understanding of pathogenic mechanisms in SLE disease activity is inadequate. Closing this knowledge gap would improve the ability to identify individuals at risk of increased disease activity and permanent organ damage, define windows of opportunity for early intervention, and facilitate the development of pathway-targeted treatments.

Recognition and early treatment to prevent tissue and organ damage is challenging, as signs and symptoms of high disease activity are captured after their occurrence. Despite validated clinical disease activity instruments and improved treatment strategies, persistently active disease remains a burden for SLE patients. Increased morbidity and early mortality associated with treatment required to manage active disease, in particular steroids, as well as permanent organ damage, including renal damage, further escalates costs. In addition, long-term use of steroids and other immune-suppressants required to manage disease activity are associated with increased morbidity. The inability to proactively manage clinical disease limits medical care to reactive treatment, precluding proactive strategies of adding or increasing steroid-sparing immune modifying agents to prevent end-organ damage and reduce the pathogenic and socioeconomic burdens of SLE.

Current biomarkers in SLE have limited utility for forecasting permanent organ damage. Although SLE-associated autoantibody specificities such as anti-dsDNA, anti-spliceosome and anti-Ro/SSA, accumulate in SLE patients, their presence is not sufficient to predict persistent active disease and progression to permanent organ damage. ANAs are also found in sera from patients with other systemic rheumatic diseases, and from healthy individuals who do not go on to develop SLE, including some unaffected family members of SLE patients, and up to 14% of the general population. Because individuals may remain healthy despite being ANA-positive, ANA positivity alone is likely not the sole pathogenic driver of SLE. In addition to ANA positivity, the dysregulation of various immune pathways driven by soluble mediators may contribute to the development of clinical disease. No single factor or mechanism is likely sufficient to explain the complexity and heterogeneity of SLE pathogenesis; thus a multivariate, longitudinal approach is warranted to delineate mechanisms of early disease pathogenesis and discern unique parameters that forecast SLE classification.

Despite clinical trials of a number of directed immune pathway treatments, including the first FDA-approved drug for SLE in over 50 years, belimumab, the vast majority of these studies fail, in part due to lack of understanding of the immune pathways dysregulated in a given patient. The need for immune-informed biomarkers as surrogate endpoints for clinical disease activity is becoming more pressing. Administrative burden limits the use of validated SLE clinical disease activity measures in routine practice. Validated disease activity instruments, such as the currently used hybrid Systemic Lupus Erythematosus Disease Activity Index (hSLEDAI) and the British Isles Lupus Assessment Group (BILAG) index, are labor intensive and require ongoing, specialized training as these clinical instruments are updated. Relying solely on physician experience to assess clinical disease activity carries the risk of unwanted variability and negative outcomes.

Clinical heterogeneity in SLE underlies the scientific premise that: heterogeneous immune dysregulation underlies clinical disease activity. Two of the inventors have previously shown that patients exhibit immune dysregulation prior to the onset of clinical SLE, amplified in a feed-forward mechanism as patients suffer tissue damage, develop clinical sequelae, and ultimately reach disease classification. The inventors also described the accumulation of multiple SLE-associated autoantibodies (AutoAbs) and dysregulated inflammatory and regulatory immune pathways on the path to clinical disease. To date, however, the lack of an immune mechanism-informed disease management test in SLE stems from no individual immune pathway-informed biomarker acting as a universal surrogate for either concurrent or future clinical disease activity.

Thus, a need remains for novel methods for detecting, tracking, and evaluating disease activity and progression in patients with classified SLE.

BRIEF SUMMARY

In one embodiment, the present invention includes a method for characterizing disease activity in a systemic lupus erythematosus (SLE) patient, comprising: (a) obtaining a dataset associated with a blood, serum, plasma or urine sample from the patient, wherein the dataset comprises data representing the level of one or more biomarkers in the blood, serum, plasma or urine sample from each of (b) to (g); (b) assessing the dataset for a presence or an amount of protein expression of at least one innate serum or plasma mediator biomarker selected from: IL-1α, IL-1β, IL-1RA, IFN-α, IL-15, IL-12p70, IL-6, and IL-7; (c) assessing the dataset for a presence or an amount of protein expression of at least one adaptive serum or plasma mediator biomarker selected from: IL-2, IL-2Rα, IFN-γ, IL-4, IL-5, IL-13, IL-17A, IL-10, and TGF-β (native TGF-β and/or total TGF-β); (d) assessing the dataset for a presence or an amount of at least one chemokine/adhesion molecule biomarker selected from: IL-8/CXCL8, IP-10/CXCL10, MIG/CXCL9, MIP-1α/CCL3, MIP-1β/CCL4, MCP-1/CCL2, RANTES/CCL5, and MCP-3/CCL7; (e) assessing the dataset for a presence or an amount of at least one soluble TNF superfamily biomarker selected from: TNF-α, TNFRI, TNFRII, Fas, B-lymphocyte stimulating factor (BLyS or BAFF), and TNF-related apoptosis-inducing ligand (TRAIL); (f) assessing the dataset for a presence or an amount of at least one inflammatory mediator biomarker selected from Osteopontin (OPN), Stem Cell Factor (SCF), and Resistin; (g) assessing the dataset for a presence or an amount at least one SLE-associated autoantibody specificity biomarker selected from: dsDNA, chromatin, RiboP, Ro/SSA, La/SSB, Sm, SmRNP, and RNP; and (h) calculating a Lupus Disease Activity Immune Index (LDAII) score. In one aspect, at least 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, or 43 biomarkers are used in the calculation of the LDAII. In another aspect, the dataset is: log transformed; standardized; weighted by Spearman r correlation to the autoantibody specificities in the second dataset, and a summation of soluble protein markers equals an LDAII score. Additionally or alternatively, in another aspect, the dataset is: log transformed; standardized; weighted by Spearman r correlation to the hSLEDAI in the second dataset, and a summation of soluble protein markers equals an LDAII score. In another aspect, the performance of the at least one immunoassay comprises: obtaining the first sample, wherein the first sample comprises the protein markers; contacting the first sample with a plurality of distinct reagents; generating a plurality of distinct complexes between the reagents and markers; and detecting the complexes to generate the data. In another aspect, the at least one immunoassay comprises a multiplex assay. In another aspect, the LDAII divides a level of severity or progression of the SLE into clinically active (CA) or quiescent (CQ) disease that is either serologically (dsDNA binding and low complement) active (SA) or serologically quiescent (SQ). In another aspect, the LDAII score distinguishes between active and low lupus disease activity. In another aspect, the method further comprises administering a treatment to the patient prior to reaching clinical disease classification after determining that the patient has the prognosis for transitioning to classified SLE, wherein the treatment comprises at least one of: hydroxychloroquine (HCQ), belimumab, a nonsteroidal anti-inflammatory drug, a steroid, or a disease-modifying anti-rheumatic drug (DMARD).

In another embodiment, the present invention includes a method of evaluating disease activity and progression of Systemic Lupus Erythematosus (SLE) clinical disease in a patient comprising: obtaining a blood, serum, plasma or urine sample from the patient; performing at least one immunoassay on a sample from the patient to generate a dataset comprising at least one biomarker from each of (1) to (6): (1) assessing the dataset for a presence or an amount of protein expression of at least one innate serum or plasma mediator biomarker selected from: IL-1α, IL-1β, IL-1RA, IFN-α, IL-15, IL-12p70, IL-6, and IL-7; (2) assessing the dataset for a presence or an amount of protein expression of at least one adaptive serum or plasma mediator biomarker selected from: IL-2, IL-2Rα, IFN-γ, IL-4, IL-5, IL-13, IL-17A, IL-10, and TGF-β (native TGF-β and/or total TGF-β); (3) assessing the dataset for a presence or an amount of at least one chemokine/adhesion molecule biomarker selected from: IL-8/CXCL8, IP-10/CXCL10, MIG/CXCL9, MIP-1α/CCL3, MIP-1β/CCL4, MCP-1/CCL2, RANTES/CCL5, and MCP-3/CCL7; (4) assessing the dataset for a presence or an amount of at least one soluble TNF superfamily biomarker selected from: TNF-α, TNFRI, TNFRII, Fas, B-lymphocyte stimulating factor (BLyS or BAFF), and TNF-related apoptosis-inducing ligand (TRAIL); (5) assessing the dataset for a presence or an amount of at least one inflammatory mediator biomarker selected from Osteopontin (OPN), Stem Cell Factor (SCF), and Resistin; and (6) assessing the dataset for a presence or an amount at least one SLE-associated autoantibody specificity biomarker selected from: dsDNA, chromatin, RiboP, Ro/SSA, La/SSB, Sm, SmRNP, and RNP; and calculating an LDAII score. In one aspect, at least 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, or 43 biomarkers are used in the calculation of the LDAII. In another aspect, the dataset is: log transformed; standardized; weighted by Spearman r correlation to the autoantibody specificities in the second dataset, and a summation of the soluble protein markers equals a Lupus Disease Activity Immune Index (LDAII) score. Additionally or alternatively, in another aspect, the dataset is: log transformed; standardized; weighted by Spearman r correlation to the hSLEDAI in the second dataset, and a summation of soluble protein markers equals an LDAII score. In another aspect, performance of the at least one immunoassay comprises: obtaining the first sample, wherein the first sample comprises the protein markers; contacting the first sample with a plurality of distinct reagents; generating a plurality of distinct complexes between the reagents and markers; and detecting the complexes to generate the data. In another aspect, the at least one immunoassay comprises a multiplex assay. In another aspect, the LDAII divides a level of severity or progression of the SLE into clinically active (CA) or quiescent (CQ) disease that is either serologically (dsDNA binding and low complement) active (SA) or serologically quiescent (SQ). In another aspect, the LDAII score distinguishes between active and low lupus disease activity. In another aspect, the method further comprises administering a treatment to the SLE patient prior to reaching clinical disease classification after determining that the patient has the prognosis for transitioning to classified SLE, wherein the treatment comprises at least one of: hydroxychloroquine (HCQ), belimumab, a nonsteroidal anti-inflammatory drug, a steroid, or a disease-modifying anti-rheumatic drug (DMARD). In another aspect, obtaining the first dataset associated with the sample comprises obtaining the sample and processing the sample to experimentally determine the first dataset, or wherein obtaining the first dataset associated with the sample comprises receiving the first dataset from a third party that has processed the sample to experimentally determine the first dataset. In another aspect, an increase in the SCF, TNFRII, and MCP-1 biomarkers are indicative of renal organ involvement.

In another embodiment, the present invention includes a method of calculating a Lupus Disease Activity Immune Index (LDAII) by measuring expression levels of a set of biomarkers in a subject comprising: determining biomarker measures of a set of biomarkers by immunoassay in a physiological sample, wherein the biomarkers are peptides, proteins, peptides bearing post-translational modifications, proteins bearing post-translational modification, or a combination thereof; wherein the physiological sample is whole blood, blood plasma, blood serum, or a combination thereof; wherein the set of biomarkers comprise a dataset of measurements selected from at least one of each category of biomarkers selected from: a presence or an amount of protein expression of at least one innate serum or plasma mediator biomarker dataset selected from: IL-1α, IL-1β, IL-1RA, IFN-α, IL-15, IL-12p70, IL-6, and IL-7; a presence or an amount of protein expression of at least one adaptive serum or plasma mediator biomarker dataset selected from: IL-2, IL-2Rα, IFN-γ, IL-4, IL-5, IL-13, IL-17A, IL-10, and TGF-β (native TGF-β and/or total TGF-β); a presence or an amount of at least one chemokine/adhesion molecule biomarker dataset selected from: IL-8/CXCL8, IP-10/CXCL10, MIG/CXCL9, MIP-1α/CCL3, MIP-1 β/CCL4, MCP-1/CCL2, RANTES/CCL5, and MCP-3/CCL7; a presence or an amount of at least one soluble TNF superfamily biomarker dataset selected from: TNF-α, TNFRI, TNFRII, Fas, B-lymphocyte stimulating factor (BLyS or BAFF), and TNF-related apoptosis-inducing ligand (TRAIL); a presence or an amount of at least one inflammatory mediator biomarker selected from Osteopontin (OPN), Stem Cell Factor (SCF), and Resistin; and a presence or an amount at least one SLE-associated autoantibody specificity biomarker dataset selected from: dsDNA, chromatin, RiboP, Ro/SSA, La/SSB, Sm, SmRNP, and RNP; and calculating an LDAII score, whereby the dataset is: log transformed; standardized; weighted by Spearman r correlation to the autoantibody specificities in the second dataset, and a summation of the soluble protein markers equals an LDAII score. Additionally or alternatively, in another aspect, the dataset is: log transformed; standardized; weighted by Spearman r correlation to the hSLEDAI in the second dataset, and a summation of soluble protein markers equals an LDAII score. In another aspect, the method further comprises classifying the sample with respect to the presence or development of Systemic Lupus Erythematosus (SLE) into clinically active (CA) or quiescent (CQ) disease that is either serologically (dsDNA binding and low complement) active (SA) or serologically quiescent (SQ) in the subject using the set of biomarker measures in a classification system, wherein the classification system is a machine learning system comprising classification and regression trees selected from the group consisting of Fisher's exact test, Mann-Whitney test, Kruskal-Wallis test, Kruskal-Wallis test with Dunn's multiple comparison, Spearman's rank correlation or an ensemble thereof; and calculating the Lupus Disease Activity Immune Index (LDAII), wherein the LDAII score distinguishes between active SLE and low SLE disease activity (low clinical disease (SLEDAI<4). In another aspect, the method further comprises differentiating clinically and serologically quiescent (CQSQ) SLE patients compared to healthy controls. In another aspect, the method further comprises an amount of at least 7, 8, 9, 10, 11, 12, 13, 14, 15, 16, 17, 18, 19, 20, 21, 22, 23, 24, 25, 26, 27, 28, 29, 30, 31, 32, 33, 34, or 35, 36, 37, 38, 39, 40, 41, 42, or 43 biomarkers are used in the calculation of the LDAII. In another aspect, the immunoassay is a multiplexed immunoassay. In another aspect, the LDAII was further calculated as follows: a concentration biomarkers is determined and log-transformed for the subject and each log-transformed soluble mediator level determined for the subject sample is standardized as follows: (observed value)–(mean value of all SLE patients and healthy control visits)/(standard deviation of all SLE patient and healthy control visits); generating Spearman coefficients from a linear regression model testing associations between one or more auto-antibody (AutoAb) specificities for each soluble mediator assessed in the SLE patient compared to healthy controls (Spearman r); transforming and standardizing the values of the soluble mediator levels of the subject and the values weighted (multiplied) by their respective Spearman coefficients (Spearman r); and summing for each participant visit, the log transformed, standardized and weighted values for each of the four or more soluble mediators to calculate the LDAII. In another aspect, an increase in the LDAII is indicative of at least one of: SLE disease progression, increased autoimmune disease activity, or organ damage.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF EXAMPLE EMBODIMENTS

Figure 1:
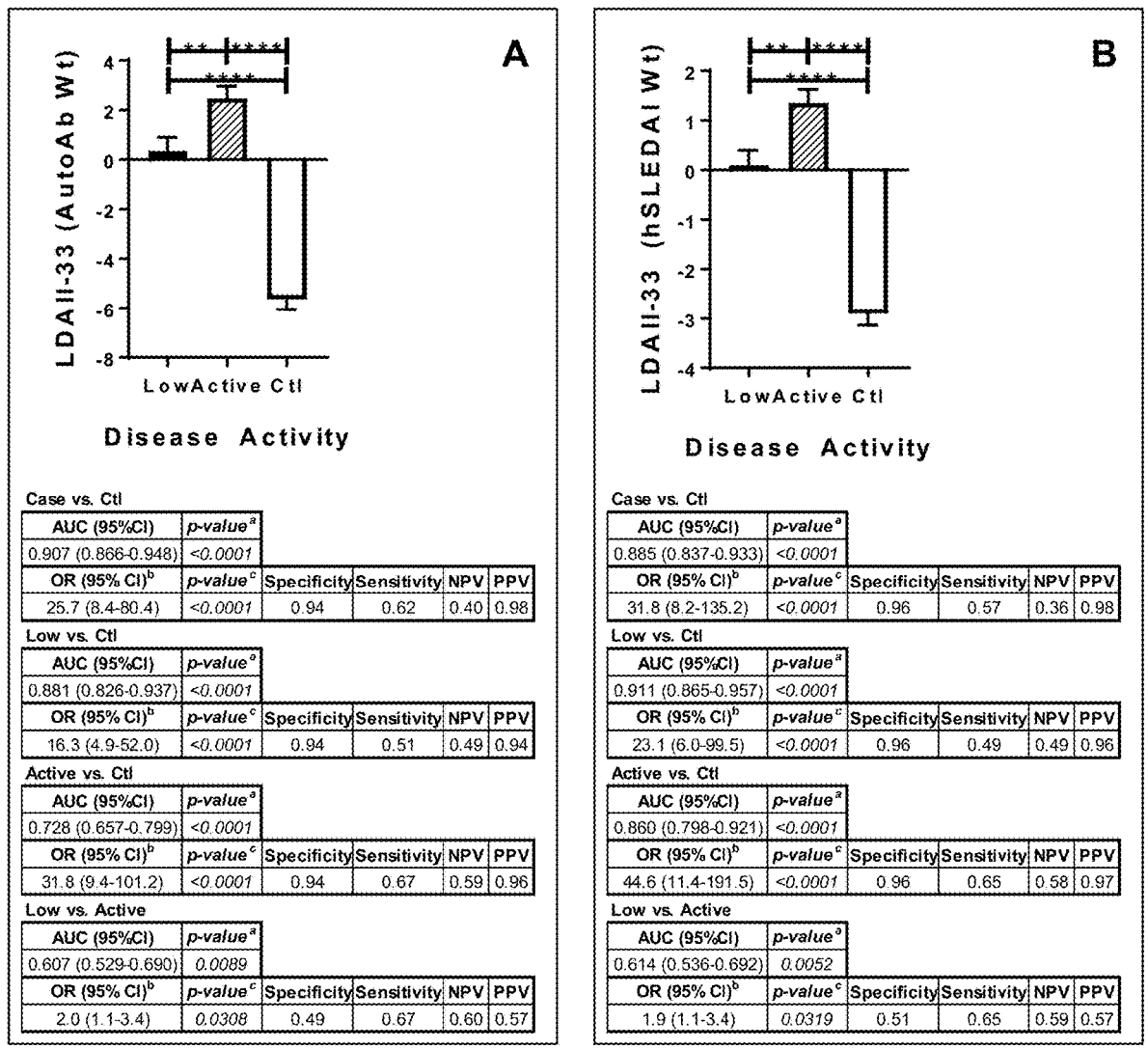
FIG. 1. Lupus Disease Activity Immune Index (LDAII), informed by 33 mediators (LDAII-33) and weighted either by #AutoAb specificities (A) or hSLEDAI score (B) differentiates SLE patients with low (hSLEDAI<4) or active (hSLEDAI≥4) disease from race/gender/age-matched healthy individuals (Ctl). Log-transformed, standardized data for each soluble mediator in SLE patients and Ctls was weighted by the Spearman r comparing soluble mediator levels vs. number of SLE-associated AutoAb specificities present (A) or hSLEDAI score (B). Mean LDAII-33±SEM shown in graphs. p<0.01; **p<0.0001 by Kruskal Wallis with Dunn's Multiple Comparison; $^a$Receiver Operating Characteristic (ROC) curve; AUC=Area under the ROC curve; $^b$Odds Ratio (# of Low vs Active Disease with Positive or Negative LDAII-33); $^c$Fisher's Exact test.

The following description of example embodiments provides information that enables a person skilled in the art to make and use the subject matter set forth in the appended claims, but it may omit certain details already well-known in the art. While various embodiments are discussed in detail below, it should be appreciated that the disclosed subject matter provides many applicable inventive concepts that can be embodied in various contexts. The following detailed description is, therefore, to be taken as illustrative and not limiting.

To facilitate the understanding of this invention, a number of terms are defined below. Terms defined herein have meanings as commonly understood by a person of ordinary skill in the areas relevant to the present invention. Terms such as "a," "an," and "the" are not intended to refer to only a singular entity, but include the general class of which a specific example may be used for illustration. The terminology herein is used to describe specific embodiments of the invention, but their usage does not limit the invention, except as outlined in the claims.

The present inventors leveraged plasma samples serially collected from Systemic lupus erythematosus (SLE) patients in the Oklahoma Cohort for Rheumatic Diseases to compare levels and determine temporal relationships between autoantibody specificities and immune mediators from multiple immune pathways in SLE patients with low or active disease compared to matched, healthy controls. The present invention sheds light on potential mechanisms of immunopathogenesis as it relates to clinical disease activity, whereby dysregulation of immune mediators occurs alongside and independent of autoantibody accumulation. Further, the present invention includes the design and validation of a reliable and sensitive tool to assess the immune status of lupus patients as it relates to clinical disease activity. The present invention can be used to identify high risk patients in need of rheumatology referral and enrollment in prospective, preclinical intervention studies, as well as inform the development of novel treatment strategies to avert or delay tissue damage. In addition, the present invention can be used to augment telehealth to prioritize the need for in-person clinic visits.

As used herein, the term "dataset" refers to a set of numerical values resulting from evaluation of a sample (or population of samples) under a desired condition. The values of the dataset can be obtained, for example, by experimentally obtaining measures from a sample, such as a patient sample, and building a dataset from these measurements. Alternatively, the dataset can be obtained from a database or a server on which the dataset has been stored, or even a service provider such as an internal or third party laboratory.

As used herein, the term "disease" in the context of the present invention refers to any disorder, condition, sickness, or ailment, that manifests in, for example, a dysfunctional or incorrectly functioning immune system that causes, e.g., SLE.

As used herein, the term "sample" refers to any biological sample that is isolated from a subject, which can include, without limitation, a single cell or multiple cells, fragments of cells, an aliquot of body fluid, whole blood, platelets, serum, plasma, red blood cells, white blood cells or leucocytes, endothelial cells, tissue biopsies, synovial fluid, lymphatic fluid, ascites fluid, and interstitial or extracellular fluid. The term "sample" also encompasses the fluid in spaces between cells, including gingival crevicular fluid, bone marrow, cerebrospinal fluid, saliva, mucous, sputum, semen, sweat, urine, or any other bodily fluids.

As used herein, the term "blood sample" refers to whole blood or any fraction thereof, including blood cells, red blood cells, white blood cells or leucocytes, platelets, serum and plasma. Samples can be obtained from a subject by means including but not limited to venipuncture, excretion, ejaculation, massage, biopsy, needle aspirate, lavage, scraping, surgical incision, or intervention or other means known in the art.

As used herein, the term "subject" or "patient" refers generally to a mammal, which includes, but is not limited to, a human, non-human primate, dog, cat, mouse, rat, cow, horse, and pig, without regard to gender or age. A subject can be one who has been previously diagnosed or identified as having an auto-immune and/or inflammatory disease, and which may have already undergone, or is undergoing, a therapeutic intervention for the auto-immune and/or inflammatory disease. However, a subject can also include a patient not previously diagnosed as having the auto-immune and/or inflammatory disease, for example, a subject who exhibits one or more symptoms or risk factors for the auto-immune and/or inflammatory disease, or a subject who does not exhibit symptoms or risk factors for the auto-immune and/or inflammatory disease, or a subject who is asymptomatic for the auto-immune and/or inflammatory disease.

As used herein, the phrase "innate serum or plasma mediator biomarker(s)" refers to one or more of the following biomarkers: IL-1α, IL-1β, IL-1RA, IFN-α, IL-15, IL-12p70, IL-6, and IL-7. These biomarkers can be measured at the RNA or protein level and can be obtained from samples, e.g., blood, serum, plasma and/or urine sample from the patient, which is a mammal, e.g., a human patient. The abbreviations for all the biomarkers used herein are well-known to the skilled artisan, e.g., IL-1 is interleukin-1, and so forth. The abbreviations can be matched to the protein at, e.g., www.genecards.org.

As used herein, the phrase "adaptive serum or plasma mediator biomarker(s)" refers to one or more of the following biomarkers: IL-2, IL-2Rα, IFN-γ, IL-4, IL-5, IL-13, IL-17A, IL-10, and TGF-β (native TGF-β and/or total TGF-β). These biomarkers can be measured at the RNA or protein level and can be obtained from samples, e.g., blood, serum, plasma and/or urine sample from the patient, which is a mammal, e.g., a human patient.

As used herein, the phrase "chemokine biomarker(s)" refers to one or more of the following biomarkers: IL-8/CXCL8, IP-10/CXCL10, MIG/CXCL9, MIP-1α/CCL3, MIP-1 β/CCL4, MCP-1/CCL2, RANTES/CCL5, and MCP-3/CCL7. These biomarkers can be measured from samples, e.g., blood, serum, plasma and/or urine sample from the patient, which is a mammal, e.g., a human patient.

As used herein, the phrase "soluble TNF superfamily biomarker(s)" refers to one or more of the following biomarkers: TNF-α, TNFRI, TNFRII, Fas, BLyS, and TNF-related apoptosis-inducing ligand (TRAIL). These biomarkers can be measured at the RNA or protein level and can be obtained from samples, e.g., blood, serum, plasma and/or urine sample from the patient, which is a mammal, e.g., a human patient.

As used herein, the phrase "inflammatory mediator biomarker(s)" refers to one or more of the following biomarkers: Osteopontin (OPN), Stem Cell Factor (SCF), and Resistin. These biomarkers can be measured at the RNA or protein level and can be obtained from samples, e.g., blood, serum, plasma and/or urine sample from the patient, which is a mammal, e.g., a human patient.

As used herein, the phrase "SLE-associated autoantibody specificity biomarker(s)" refers to one or more of the following biomarkers that are autoantibodies against the following targets: dsDNA, chromatin, RiboP, Ro/SSA, La/SSB, Sm, SmRNP, and RNP, all of which are well-known to the skilled artisan in the SLE arts. These biomarkers can be measured at the RNA or protein level and can be obtained from samples, e.g., blood, serum, plasma and/or urine sample from the patient, which is a mammal, e.g., a human patient.

As used herein, a "healthy control" refers to a healthy control that is not an SLE patient that has no clinical evidence of SLE.

The present invention includes methods for identifying and changing the treatment of SLE patients associated with clinical disease activity as defined by the Safety of Estrogens in Lupus National Assessment-Systemic Lupus Erythematosus Disease Activity Index (SELENA-SLEDAI) with proteinuria as defined by the SLEDAI-2K, known as the hybrid-SLEDAI (hSLEDAI). As clinical manifestations of SLE contribute to disease activity in the hSLEDAI after they have occurred, the present invention is used to determine if the subject may be exhibiting biomarkers that may contribute to disease activity that places the SLE patient at risk for permanent organ damage and early mortality.

Following the ACR, SLICC, and EULAR/ACR criteria for SLE classification, patients must meet multiple, defined criteria for SLE to reach disease classification (diagnosis), including: malar rash, discoid rash, photosensitivity, oral ulcers, non-scarring alopecia, arthritis, serositis (pleuritis or pericarditis), renal disorder (proteinuria or cellular casts), neurologic disorder (delirium, seizures, or psychosis), hematologic disorder (hemolytic anemia, leukopenia, lymphopenia, or thrombocytopenia), fever, immunologic disorder (presence of anti-DNA, anti-Sm, or anti-phospholipid antibodies or low C3 and/or C4 and/or CH50 complement levels), and positive ANA (HEp-2 IIF assay). These criteria may be used, as known to the skilled artisan, e.g., using the ACR rule for the classification of SLE, the patient must satisfy at least 4 criteria; using the SLICC rule for the classification of SLE, the patient must satisfy at least 4 criteria, including at least one clinical criterion and one immunologic criterion OR the patient must have biopsy proven lupus nephritis in the presence of antinuclear antibodies or anti-double-stranded DNA antibodies; using the EULAR/ACR rule for the classification of SLE, the patient must satisfy ANA positivity (≥1:80 titer by HEp-2 IIF assay), one clinical criterion, and ≥10 points (from 7 clinical and 3 immunology domains).

Biomarker detection. There are a variety of methods that can be used to assess protein expression. One such approach is to perform protein identification with the use of antibodies.

As used herein, the term "antibody" refers, broadly, to any immunologic binding agent such as IgG, IgM, IgA, IgD and IgE antibody, or subclass thereof, or binding fragments thereof, including single chain fragments. Generally, IgG and/or IgM are used because they are the most common antibodies in the physiological situation and because are commonly and easily made in a laboratory setting. As used herein, the term "antibody fragment" refers to any antibody-like molecule that has an antigen binding region, and includes antibody fragments such as Fab', Fab, F(ab')$_2$, single domain antibodies (DABs), Fv, scFv (single chain Fv), and the like. The techniques for preparing and using various antibody-based constructs and fragments are well known in the art. Means for preparing and characterizing antibodies, both polyclonal and monoclonal, are also well known in the art (see, e.g., Antibodies: A Laboratory Manual, Cold Spring Harbor Laboratory, 1988; relevant portions incorporated herein by reference).

In accordance with the present invention, examples of immunodetection methods are provided. Some immunodetection methods include enzyme-linked immunosorbent assay (ELISA), radioimmunoassay (RIA), immunoradiometric assay, fluoroimmunoassay, chemiluminescent assay, bioluminescent assay, and Western blot to mention a few. The steps of various useful immunodetection methods have been described in the scientific literature, Current Protocols in Immunology, Wiley & Sons Press, 2017, relevant portions incorporated herein by reference.

In general, the immune-binding methods include obtaining a sample suspected of containing a relevant polypeptide, and contacting the sample with a first antibody under conditions effective to allow the formation of immunocomplexes. In terms of antigen detection, the biological sample analyzed may be any sample that is suspected of containing an antigen, such as, for example, a tissue section or specimen, a homogenized tissue extract, a cell, or even a biological fluid.

Contacting the chosen biological sample with the antibody under effective conditions and for a period of time sufficient to allow the formation of immune complexes (primary immune complexes) is generally a matter of simply adding the antibody composition to the sample and incubating the mixture for a period of time long enough for the antibodies to form immune complexes with, i.e., to bind to, any antigens present. After this time, the sample-antibody composition, such as a tissue section, ELISA plate, dot blot or western blot, will generally be washed to remove any non-specifically bound antibody species, allowing only those antibodies specifically bound within the primary immune complexes to be detected.

In general, the detection of immunocomplex formation is well known in the art and may be achieved through the application of numerous approaches. These methods are generally based upon the detection of a label or marker, such as any of those radioactive, fluorescent, biological and enzymatic tags. Patents concerning the use of such labels include U.S. Pat. Nos. 3,817,837; 3,850,752; 3,939,350; 3,996,345; 4,277,437; 4,275,149 and 4,366,241, each incorporated herein by reference. Of course, one may find additional advantages through the use of a secondary binding ligand such as a second antibody and/or a biotin/avidin ligand binding arrangement, as is known in the art.

The antibody, or binding fragment thereof, can be employed in the detection may itself be linked to a detectable label, wherein one would then simply detect this label, thereby allowing the amount of the primary immune complexes in the composition to be determined. Alternatively, the first antibody that becomes bound within the primary immune complexes may be detected by means of a second binding ligand that has binding affinity for the antibody. In these cases, the second binding ligand may be linked to a detectable label. The second binding ligand is itself often an antibody, which may thus be termed a "secondary" antibody. The primary immune complexes are contacted with the labeled, secondary binding ligand, or antibody, under effective conditions and for a period of time sufficient to allow the formation of secondary immune complexes. The secondary immune complexes are then generally washed to remove any non-specifically bound labeled secondary antibodies or ligands, and the remaining label in the secondary immune complexes is then detected.

Further methods include the detection of primary immune complexes by a two-step approach. A second binding ligand, such as an antibody, that has binding affinity for the antibody is used to form secondary immune complexes, as described above. After washing, the secondary immune complexes are contacted with a third binding ligand or antibody that has binding affinity for the second antibody, again under effective conditions and for a period of time sufficient to allow the formation of immune complexes (tertiary immune complexes). The third ligand or antibody is linked to a detectable label, allowing detection of the tertiary immune complexes thus formed. This system may provide for signal amplification if this is desired.

One method of immunodetection uses two different antibodies. A first step biotinylated, monoclonal or polyclonal antibody is used to detect the target antigen(s), and a second step antibody is then used to detect the biotin attached to the complexed biotin. In that method the sample to be tested is first incubated in a solution containing the first step antibody. If the target antigen is present, some of the antibody binds to the antigen to form a biotinylated antibody/antigen complex. The antibody/antigen complex is then amplified by incubation in successive solutions of streptavidin (or avidin), biotinylated DNA, and/or complementary biotinylated DNA, with each step adding additional biotin sites to the antibody/antigen complex. The amplification steps are repeated until a suitable level of amplification is achieved, at which point the sample is incubated in a solution containing the second step antibody against biotin. This second step antibody is labeled, as for example with an enzyme that can be used to detect the presence of the antibody/antigen complex by histoenzymology using a chromogen substrate. With suitable amplification, a conjugate can be produced which is macroscopically visible.

Another known method of immunodetection takes advantage of the immuno-PCR (Polymerase Chain Reaction) methodology. The PCR method is similar to the Cantor method up to the incubation with biotinylated DNA, however, instead of using multiple rounds of streptavidin and biotinylated DNA incubation, the DNA/biotin/streptavidin/antibody complex is washed out with a low pH or high salt buffer that releases the antibody. The resulting wash solution is then used to carry out a PCR reaction with suitable primers with appropriate controls. At least in theory, the enormous amplification capability and specificity of PCR can be utilized to detect a single antigen molecule.

As detailed above, immunoassays are in essence binding assays. Certain immunoassays are the various types of ELISAs and RIA known in the art. However, it will be readily appreciated that detection is not limited to such techniques, and Western blotting, dot blotting, FACS analyses, and the like may also be used.

In one exemplary ELISA, the antibodies of the invention are immobilized onto a selected surface exhibiting protein affinity, such as a well in a polystyrene microtiter plate. Then, a test composition suspected of containing the antigen, such as a clinical sample, is added to the wells. After binding and washing to remove non-specifically bound immune complexes, the bound antigen may be detected. Detection is generally achieved by the addition of another antibody that is linked to a detectable label. This type of ELISA is a simple "sandwich ELISA." Detection may also be achieved by the addition of a second antibody, followed by the addition of a third antibody that has binding affinity for the second antibody, with the third antibody being linked to a detectable label.

In some embodiments, the principles of ELISA may be employed in the context of a microfluidic cartridge, for example, a plate having 96 separate wells. This microfluidic cartridge allows for "multiplexing" by running several "single" ELISA-type assays in parallel using a nanoreactor. Unlike technologies that assess multiple analytes in a single well, the use of the microfluidic cartridge to implement the principles of ELISA allows for one (e.g., a single) analyte to be assessed per nanoreactor. Multiple nanoreactors can be fit on a single assay cartridge and run in parallel. This technique combines the advantages of multiplexing—sample sparing and cost savings—with the advantages of a single-analyte ELISA—no cross-reactivity or cross-inhibition from antibodies used to detect multiple analytes in the same well. Microfluidic ELISA approaches allow for include multiplexing (thereby reducing costs and labor), generation of more data with less sample, less labor and lower costs, faster, more reproducible results in comparison to solid, planar arrays, and focused, flexible multiplexing to meet a wide variety of applications.

In one exemplary ELISA, the analytes disclosed herein are immobilized onto a microfluidic surface exhibiting an affinity for a particular analyte, such as a well of a glass nanoreactor. A test composition suspected of containing the analyte, such as a clinical sample, is added to each well of the microfluidic device. After binding and washing to remove non-specifically bound immune complexes, the bound analyte may be detected. Detection is generally achieved by the addition of another antibody that is linked to a detectable label.

Additionally or alternatively, in some embodiments, the principles of ELISA may be implemented via other multiplexed immunoassays such as a proximity extension assay (e.g. commercially available from Olink company), an electrochemluminescence assay (e.g., commercially available from Meso Scale Discovery company), or a protein array-based assay.

In another exemplary ELISA, the samples suspected of containing the antigen are immobilized onto the well surface and then contacted with the anti-ORF message and anti-ORF translated product antibodies of the invention. After binding and washing to remove non-specifically bound immune complexes, the bound anti-ORF message and anti-ORF translated product antibodies are detected. Where the initial anti-ORF message and anti-ORF translated product antibodies are linked to a detectable label, the immune complexes may be detected directly. Again, the immune complexes may be detected using a second antibody that has binding affinity for the first anti-ORF message and anti-ORF translated product antibody, with the second antibody being linked to a detectable label.

Another type of ELISA in which the antigens are immobilized, involves the use of antibody competition in the detection. In this ELISA, labeled antibodies against an antigen are added to the wells, allowed to bind, and detected by means of their label. The amount of an antigen in an unknown sample is then determined by mixing the sample with the labeled antibodies against the antigen during incubation with coated wells. The presence of an antigen in the sample acts to reduce the amount of antibody against the antigen available for binding to the well and thus reduces the ultimate signal. This is also appropriate for detecting antibodies against an antigen in an unknown sample, where the unlabeled antibodies bind to the antigen-coated wells and also reduces the amount of antigen available to bind the labeled antibodies.

As used herein, the phrase "under conditions effective to allow immune complex (antigen/antibody) formation" refers to those conditions, which may also include diluting the antigens and/or antibodies with solutions such as BSA, bovine gamma globulin (BGG) or phosphate buffered saline (PBS)/Tween®, under which an antibody or binding fragment thereof interacts with the antigen that is the specific target of the antibody. These added agents also tend to assist in the reduction of nonspecific background. The "suitable" conditions such that the incubation is at a temperature or for a period of time sufficient to allow effective binding. Incubation steps are typically from about 1 to 2 to 4 hours or so, at temperatures preferably on the order of 25° C. to 27° C., or may be overnight at about 4° C. or so.

Another antibody-based approach to assessing biomarkers expression is Fluorescence-Activated Cell Sorting (FACS), a specialized type of flow cytometry. It provides a method for sorting a heterogeneous mixture of biological cells into two or more containers, one cell at a time, based upon the specific light scattering and fluorescent characteristics of each cell. It provides fast, objective and quantitative recording of fluorescent signals from individual cells as well as physical separation of cells of particular interest. A cell suspension is entrained in the center of a narrow, rapidly flowing stream of liquid. The flow is arranged so that there is a large separation between cells relative to their diameter. A vibrating mechanism causes the stream of cells to break into individual droplets. The system is adjusted so that there is a low probability of more than one cell per droplet. Just before the stream breaks into droplets, the flow passes through a fluorescence measuring station where the fluorescent character of interest of each cell is measured. An electrical charging ring is placed just at the point where the stream breaks into droplets. A charge is placed on the ring based on the immediately prior fluorescence intensity measurement, and the opposite charge is trapped on the droplet as it breaks from the stream. The charged droplets then fall through an electrostatic deflection system that diverts droplets into containers based upon their charge. In some systems, the charge is applied directly to the stream, and the droplet breaking off retains charge of the same sign as the stream. The stream is then returned to neutral after the droplet breaks off. One common way to use FACS is with a fluorescently labeled antibody that binds to a target on or in a cell, thereby identifying cells with a given target. This technique can be used quantitatively where the amount of fluorescent activity correlates to the amount of target, thereby permitting one to sort based on relative amounts of fluorescence, and hence relative amounts of the target.

Bead-based xMAP Technology may also be applied to immunologic detection in conjunction with the presently claimed invention. This technology combines advanced fluidics, optics, and digital signal processing with proprietary microsphere technology to deliver multiplexed assay capabilities. Featuring a flexible, open-architecture design, xMAP technology can be configured to perform a wide variety of bioassays quickly, cost-effectively and accurately.

Fluorescently-coded microspheres are arranged in up to 500 distinct sets. Each bead set can be coated with a reagent specific to a particular bioassay (e.g., an antibody), allowing the capture and detection of specific analytes from a sample, such as the biomarkers of the present application. Inside the xMAP multiplex analyzer, a light source excites the internal dyes that identify each microsphere particle, and also any reporter dye captured during the assay. Many readings are made on each bead set, which further validates the results. Using this process, xMAP technology allows multiplexing of up to 500 unique bioassays within a single sample, both rapidly and precisely. Unlike other flow cytometer microsphere-based assays which use a combination of different sizes and color intensities to identify an individual microsphere, xMAP technology uses 5.6 micron size microspheres internally dyed with red and infrared fluorophores via a proprietary dying process to create 500 unique dye mixtures which are used to identify each individual microsphere.

Some of the advantages of xMAP include multiplexing (reduces costs and labor), generation of more data with less sample, less labor and lower costs, faster, more reproducible results than solid, planar arrays, and focused, flexible multiplexing of 1 to 500 analytes to meet a wide variety of applications.

Nucleic Acid Detection In other embodiments for detecting protein expression, one may assay for gene transcription. For example, an indirect method for detecting protein expression is to detect mRNA transcripts from which the proteins are made.

Amplification of Nucleic Acids. Since many mRNAs are present in relatively low abundance, nucleic acid amplification greatly enhances the ability to assess expression. The general concept is that nucleic acids can be amplified using paired primers flanking the region of interest. As used herein, the term "primer," refers to any nucleic acid that is capable of priming the synthesis of a nascent nucleic acid in a template-dependent process. Typically, primers are oligonucleotides from ten to twenty and/or thirty base pairs in length, but longer sequences can be employed. Primers may be provided in double-stranded and/or single-stranded form, although the single-stranded form is often used.

Pairs of primers designed to selectively hybridize to nucleic acids corresponding to selected genes are contacted with the template nucleic acid under conditions that permit selective hybridization. Depending upon the desired application, high stringency hybridization conditions may be selected that will only allow hybridization to sequences that are completely complementary to the primers In other embodiments, hybridization may occur under reduced stringency to allow for amplification of nucleic acids containing one or more mismatches with the primer sequences. Once hybridized, the template-primer complex is contacted with one or more enzymes that facilitate template-dependent nucleic acid synthesis. Multiple rounds of amplification, also referred to as "cycles," are conducted until a sufficient amount of amplification product is produced.

The amplification product may be detected or quantified. In certain applications, the detection may be performed by visual method. Alternatively, the detection may involve indirect identification of the product via chemiluminescence, radioactive scintigraphy of incorporated radiolabel or fluorescent label or even via a system using electrical and/or thermal impulse signals.

A number of template dependent processes are available to amplify the oligonucleotide sequences present in a given template sample. One of the best known amplification methods is the polymerase chain reaction (PCR) which is described in detail in U.S. Pat. Nos. 4,683,195, 4,683,202 and 4,800,159, each of which is incorporated herein by reference in their entirety.

A reverse transcriptase-PCR amplification procedure may be performed to quantify the amount of mRNA amplified. Methods of reverse transcribing RNA into cDNA are well known (see Sambrook et al, Molecular Cloning: A Laboratory Manual, 2001). Alternative methods for reverse transcription utilize thermostable DNA polymerases. These methods are described in WO 90/07641. Polymerase chain reaction methodologies are well known in the art. Representative methods of RT-PCR are described in U.S. Pat. No. 5,882,864. Standard PCR usually uses one pair of primers to amplify a specific sequence, while multiplex-PCR (MPCR) uses multiple pairs of primers to amplify many sequences simultaneously. The presence of many PCR primers in a single tube could cause many problems, such as the increased formation of misprimed PCR products and "primer dimers," the amplification discrimination of longer DNA fragment and so on. Normally, MPCR buffers contain a Taq Polymerase additive, which decreases the competition among amplicons and the amplification discrimination of longer DNA fragment during MPCR. MPCR products can further be hybridized with gene-specific probe for verification. Theoretically, one should be able to use as many as primers as necessary. However, due to side effects (primer dimers, misprimed PCR products, etc.) caused during MPCR, there is a limit (less than 20) to the number of primers that can be used in a MPCR reaction. See also European Application No. 0 364 255, relevant portions incorporated herein by reference.

Another method for amplification is ligase chain reaction ("LCR"), disclosed in European Application No. 320 308, and incorporated herein by reference in its entirety. U.S. Pat. No. 4,883,750 describes a method similar to LCR for binding probe pairs to a target sequence. A method based on PCR and oligonucleotide ligase assay (OLA), disclosed in U.S. Pat. No. 5,912,148, may also be used. Alternative methods for amplification of target nucleic acid sequences that may be used in the practice of the present invention are disclosed in U.S. Pat. Nos. 5,843,650, 5,846,709, 5,846,783, 5,849,546, 5,849,497, 5,849,547, 5,858,652, 5,866,366, 5,916,776, 5,922,574, 5,928,905, 5,928,906, 5,932,451, 5,935,825, 5,939,291 and 5,942,391, GB Application No. 2 202 328, and in PCT Application No. PCT/US89/01025, from each relevant portions incorporated herein by reference.

Detection of Nucleic Acids. Following any amplification, it may be desirable to separate the amplification product from the template and/or the excess primer. In one embodiment, amplification products are separated by agarose, agarose-acrylamide or polyacrylamide gel electrophoresis using standard methods (Sambrook et al, Molecular Cloning: A Laboratory Manual, 2001). Separated amplification products may be cut out and eluted from the gel for further manipulation. Using low melting point agarose gels, the separated band may be removed by heating the gel, followed by extraction of the nucleic acid. Separation of nucleic acids may also be effected by chromatographic techniques known in art. There are many kinds of chromatography which may be used in the practice of the present invention, including adsorption, partition, ion-exchange, hydroxylapatite, molecular sieve, reverse-phase, column, paper, thin-layer, and gas chromatography as well as HPLC.

In certain embodiments, the amplification products are visualized. A typical visualization method involves staining of a gel with ethidium bromide and visualization of bands under UV light. Alternatively, if the amplification products are integrally labeled with radio- or fluorometrically-labeled nucleotides, the separated amplification products can be exposed to x-ray film or visualized under the appropriate excitatory spectra.

In one embodiment, following separation of amplification products, a labeled nucleic acid probe is brought into contact with the amplified marker sequence. The probe preferably is conjugated to a chromophore but may be radiolabeled. In another embodiment, the probe is conjugated to a binding partner, such as an antibody or biotin, or another binding partner carrying a detectable moiety.

In particular embodiments, detection is by Southern blotting and hybridization with a labeled probe. The techniques involved in Southern blotting are well known to those of skill in the art (see Sambrook et al, Molecular Cloning: A Laboratory Manual, 2001). One example of the foregoing is described in U.S. Pat. No. 5,279,721, incorporated by reference herein, which discloses an apparatus and method for the automated electrophoresis and transfer of nucleic acids. The apparatus permits electrophoresis and blotting without external manipulation of the gel and is ideally suited to carrying out methods according to the present invention.

Other methods of nucleic acid detection that may be used in the practice of the instant invention are disclosed in U.S. Pat. Nos. 5,840,873, 5,843,640, 5,843,651, 5,846,708, 5,846,717, 5,846,726, 5,846,729, 5,849,487, 5,853,990, 5,853,992, 5,853,993, 5,856,092, 5,861,244, 5,863,732, 5,863,753, 5,866,331, 5,905,024, 5,910,407, 5,912,124, 5,912,145, 5,919,630, 5,925,517, 5,928,862, 5,928,869, 5,929,227, 5,932,413 and 5,935,791, each of which is incorporated herein by reference.

Nucleic Acid Arrays. Microarrays include a plurality of polymeric molecules spatially distributed over, and stably associated with, the surface of a substantially planar substrate, e.g., biochips. Microarrays of polynucleotides have been developed and find use in a variety of applications, such as screening and DNA sequencing. One area in particular in which microarrays find use is in gene expression analysis.

In gene expression analysis with microarrays, an array of "probe" oligonucleotides is contacted with a nucleic acid sample of interest, i.e., target, such as polyA mRNA from a particular tissue type. Contact is carried out under hybridization conditions and unbound nucleic acid is then removed. The resultant pattern of hybridized nucleic acid provides information regarding the genetic profile of the sample tested. Methodologies of gene expression analysis on microarrays are capable of providing both qualitative and quantitative information.

A variety of different arrays that may be used with the present invention are known in the art. The probe molecules of the arrays which are capable of sequence specific hybridization with target nucleic acid may be polynucleotides or hybridizing analogues or mimetics thereof, including: nucleic acids in which the phosphodiester linkage has been replaced with a substitute linkage, such as phophorothioate, methylimino, methylphosphonate, phosphoramidate, guanidine and the like; nucleic acids in which the ribose subunit has been substituted, e.g., hexose phosphodiester; peptide nucleic acids; and the like. The length of the probes will generally range from 10 to 1,000 nucleotides, where in some embodiments the probes will be oligonucleotides and usually range from 15 to 150 nucleotides and more usually from 15 to 100 nucleotides in length, and in other embodiments the probes will be longer, usually ranging in length from 150 to 1,000 nucleotides, where the polynucleotide probes may be single- or double-stranded, usually single-stranded, and may be PCR fragments amplified from cDNA.

The probe molecules on the surface of the substrates will correspond to selected genes being analyzed and be positioned on the array at a known location so that positive hybridization events may be correlated to expression of a particular gene in the physiological source from which the target nucleic acid sample is derived. The substrates with which the probe molecules are stably associated may be fabricated from a variety of materials, including plastics, ceramics, metals, gels, membranes, glasses, and the like. The arrays may be produced according to any convenient methodology, such as preforming the probes and then stably associating them with the surface of the support or growing the probes directly on the support. A number of different array configurations and methods for their production are known to those of skill in the art and disclosed in U.S. Pat. Nos. 5,445,934, 5,532,128, 5,556,752, 5,242,974, 5,384, 261, 5,405,783, 5,412,087, 5,424,186, 5,429,807, 5,436,327, 5,472,672, 5,527,681, 5,529,756, 5,545,531, 5,554,501, 5,561,071, 5,571,639, 5,593,839, 5,599,695, 5,624,711, 5,658,734, 5,700,637, and 6,004,755, relevant portions incorporated herein by reference.

Following hybridization, where non-hybridized labeled nucleic acid is capable of emitting a signal during the detection step, a washing step is employed where unhybridized labeled nucleic acid is removed from the support surface, generating a pattern of hybridized nucleic acid on the substrate surface. A variety of wash solutions and protocols for their use are known to those of skill in the art and may be used. Where the label on the target nucleic acid is not directly detectable, one then contacts the array, now comprising bound target, with the other member(s) of the signal producing system that is being employed. For example, where the label on the target is biotin, one then contacts the array with streptavidin-fluorescent conjugate under conditions sufficient for binding between the specific binding member pairs to occur. Following contact, any unbound members of the signal producing system will then be removed, e.g., by washing. The specific wash conditions employed will necessarily depend on the specific nature of the signal producing system that is employed, and will be known to those of skill in the art familiar with the particular signal producing system employed. The resultant hybridization pattern(s) of labeled nucleic acids may be visualized or detected in a variety of ways, with the particular manner of detection being chosen based on the particular label of the nucleic acid, where representative detection means include scintillation counting, autoradiography, fluorescence measurement, calorimetric measurement, light emission measurement and the like.

Prior to detection or visualization, where one desires to reduce the potential for a mismatch hybridization event to generate a false positive signal on the pattern, the array of hybridized target/probe complexes may be treated with an endonuclease under conditions sufficient such that the endonuclease degrades single stranded, but not double stranded DNA. A variety of different endonucleases are known and may be used, where such nucleases include: mung bean nuclease, Sl nuclease, and the like. Where such treatment is employed in an assay in which the target nucleic acids are not labeled with a directly detectable label, e.g., in an assay with biotinylated target nucleic acids, the endonuclease treatment will generally be performed prior to contact of the array with the other member(s) of the signal producing system, e.g., fluorescent-streptavidin conjugate. Endonuclease treatment, as described above, ensures that only end-labeled target/probe complexes having a substantially complete hybridization at the 3' end of the probe are detected in the hybridization pattern. Following hybridization and any washing step(s) and/or subsequent treatments, as described above, the resultant hybridization pattern is detected. In detecting or visualizing the hybridization pattern, the intensity or signal value of the label will be not only be detected but quantified, by which is meant that the signal from each spot of the hybridization will be measured and compared to a unit value corresponding the signal emitted by known number of end-labeled target nucleic acids to obtain a count or absolute value of the copy number of each end-labeled target that is hybridized to a particular spot on the array in the hybridization pattern.

RNA Sequencing (Transcript Counting). RNA-seq (RNA Sequencing), also called Whole Transcriptome Shotgun Sequencing (WTSS), is a technology that utilizes the capabilities of Next-Generation Sequencing (NGS) to reveal a snapshot of RNA presence and quantity from a genome at a given moment in time. The transcriptome of a cell is dynamic; it continually changes as opposed to a static genome. The recent developments of next-generation sequencing allow for increased base coverage of a DNA sequence, as well as higher sample throughput. This facilitates sequencing of the RNA transcripts in a cell, providing the ability to look at alternative gene spliced transcripts, post-transcriptional changes, gene fusion, mutations/SNPs and changes in gene expression. In addition to mRNA transcripts, RNA-Seq can look at different populations of RNA to include total RNA, small RNA, such as miRNA, tRNA, and ribosomal profiling. RNA-Seq can also be used to determine exon/intron boundaries and verify or amend previously annotated 5' and 3' gene boundaries, Ongoing RNA-Seq research includes observing cellular pathway alterations during infection, and gene expression level changes in cancer studies. Prior to NGS, transcriptomics and gene expression studies were previously done with expression microarrays, which contain thousands of DNA sequences that probe for a match in the target sequence, making available a profile of all transcripts being expressed. This was later done with Serial Analysis of Gene Expression (SAGE).

Treatments for SLE. The present subject matter contemplates the detection of certain biomarkers followed by a change in the treatment of SLE, which may include using standard therapeutic approaches where indicated. In general, the treatment of SLE involves treating elevated disease activity and trying to minimize the organ damage that can be associated with increased inflammation and increased immune complex formation/deposition/complement activation. Foundational treatment can include corticosteroids and/or anti-malarial drugs. Certain types of lupus nephritis such as diffuse proliferative glomerulonephritis require bouts of cytotoxic drugs. These drugs include, most commonly, cyclophosphamide and mycophenolate. Hydroxychloroquine (HCQ) was approved by the FDA for lupus in 1955. Some drugs approved for other diseases are used for SLE "off-label". Belimumab (Benlysta) can be used as a treatment for elevated disease activity seen in autoantibody-positive lupus patients.

Due to the variety of symptoms and organ system involvement with SLE, its severity in an individual must be assessed in order to successfully treat SLE. Mild or remittent disease may, sometimes, be safely left minimally treated with hydroxychloroquine alone. If required, nonsteroidal anti-inflammatory drugs and low dose steroids may also be used. Hydroxychloroquine (HCQ) is an FDA-approved antimalarial used for constitutional, cutaneous, and articular manifestations. Hydroxychloroquine has relatively few side effects, and there is evidence that it improves survival among people who have SLE and stopping HCQ in stable SLE patients led to increased disease flares in Canadian lupus patients. Disease-modifying antirheumatic drugs (DMARDs) are often used off-label in SLE to decrease disease activity and lower the need for steroid use. DMARDs commonly in use are methotrexate and azathioprine. In more severe cases, medications that aggressively suppress the immune system (primarily high-dose corticosteroids and major immunosuppressants) are used to control the disease and prevent damage. Cyclophosphamide is used for severe glomerulonephritis, as well as other life-threatening or organ-damaging complications, such as vasculitis and lupus cerebritis. Mycophenolic acid is also used for treatment of lupus nephritis, but it is not FDA-approved for this indication.

Depending on the dosage, people who require steroids may develop Cushing's symptoms of truncal obesity, purple striae, buffalo hump and other associated symptoms. These may subside if and when the large initial dosage is reduced, but long-term use of even low doses can cause elevated blood pressure, glucose intolerance (including metabolic syndrome and/or diabetes), osteoporosis, insomnia, avascular necrosis and cataracts. More severe steroid-associated morbidities include accelerated atherosclerosis, avascular necrosis, increased infections, diabetes, and hypertension.

Numerous new immunosuppressive drugs are being actively tested for SLE. Rather than suppressing the immune system nonspecifically, as corticosteroids do, they target the responses of individual types of immune cells. Belimumab, or a humanized monoclonal antibody against B-lymphocyte stimulating factor (BLyS or BAFF), is FDA approved for lupus treatment and decreased SLE disease activity, especially in patients with baseline elevated disease activity and the presence of autoantibodies. Addition drugs, such as abatacept, voclosporin, JAK inhibitors, Tyk inhibitors, anifrolimab, and others, are actively being studied in SLE patients and some of these drugs are already FDA-approved for treatment of rheumatoid arthritis or other disorders. Since a large percentage of people with SLE suffer from varying amounts of chronic pain, stronger prescription analgesics (pain killers) may be used if over-the-counter drugs (mainly nonsteroidal anti-inflammatory drugs) do not provide effective relief. Potent NSAIDs such as indomethacin and diclofenac are relatively contraindicated for patients with SLE because they increase the risk of kidney failure and heart failure.

Moderate pain is typically treated with mild prescription opiates such as dextropropoxyphene and co-codamol. Moderate to severe chronic pain is treated with stronger opioids, such as hydrocodone or longer-acting continuous-release opioids, such as oxycodone, MS Contin, or methadone. The fentanyl duragesic transdermal patch is also a widely used treatment option for the chronic pain caused by complications because of its long-acting timed release and ease of use. When opioids are used for prolonged periods, drug tolerance, chemical dependency, and addiction may occur. Opiate addiction is not typically a concern, since the condition is not likely to ever completely disappear. Thus, lifelong treatment with opioids is fairly common for chronic pain symptoms, accompanied by periodic titration that is typical of any long-term opioid regimen.

Intravenous immunoglobulins may be used to control SLE with organ involvement, or neuropathy. It is believed that they reduce antibody production or promote the clearance of immune complexes from the body, even though their mechanism of action is not well-understood. Unlike immunosuppressives and corticosteroids, IVIGs do not suppress the immune system, so there is less risk of serious infections with these drugs.

Avoiding sunlight is the primary change to the lifestyle of SLE sufferers, as sunlight is known to exacerbate the disease, as is the debilitating effect of intense fatigue. These two problems can lead to patients becoming housebound for long periods of time. Drugs unrelated to SLE should be prescribed only when known not to exacerbate the disease. Occupational exposure to silica, pesticides and mercury can also make the disease worsen.

Renal transplants are the treatment of choice for end-stage renal disease, which is one of the complications of lupus nephritis, but the recurrence of the full disease in the transplanted kidney is common in up to 30% of patients.

Antiphospholipid syndrome is also related to the onset of neural lupus symptoms in the brain. In this form of the disease the cause is very different from lupus: thromboses (blood clots or "sticky blood") form in blood vessels, which prove to be fatal if they move within the blood stream. If the thromboses migrate to the brain, they can potentially cause a stroke by blocking the blood supply to the brain. If this disorder is suspected in patients, brain scans are usually required for early detection. These scans can show localized areas of the brain where blood supply has not been adequate. The treatment plan for these patients requires anticoagulation. Often, low-dose aspirin is prescribed for this purpose, although for cases involving thrombosis anticoagulants such as warfarin are used.

Pharmaceutical Formulations and Delivery. A change in therapeutic application is contemplated, it will be necessary to prepare pharmaceutical compositions in a form appropriate for the intended application. Generally, this will entail preparing compositions that are essentially free of pyrogens, as well as other impurities that could be harmful to humans or animals.

Generally, appropriate salts and buffers are employed to render delivery vectors stable and allow for uptake by target cells. Buffers also will be employed when recombinant cells are introduced into a patient. Aqueous compositions of the present invention comprise an effective amount of the vector to cells, dissolved or dispersed in a pharmaceutically acceptable carrier or aqueous medium. Such compositions also are referred to as inocula.

As used herein, the phrases "pharmaceutically" or "pharmacologically acceptable", refer to molecular entities and compositions that do not produce adverse, allergic, or other untoward reactions when administered to an animal or a human. As used herein, "pharmaceutically acceptable carrier" includes any and all solvents, dispersion media, coatings, antibacterial and antifungal agents, isotonic and absorption delaying agents and the like. The use of such media and agents for pharmaceutically active substances is well known in the art. Except insofar as any conventional media or agent is incompatible with the vectors or cells of the present invention, its use in therapeutic compositions is contemplated. Supplementary active ingredients also can be incorporated into the compositions.

The active compositions of the present invention may include classic pharmaceutical preparations. Administration of these compositions according to the present invention will be via any common route so long as the target tissue is available via that route. Such routes include oral, nasal, buccal, rectal, vaginal or topical route. Alternatively, administration may be by orthotopic, intradermal, subcutaneous, intramuscular, intraperitoneal, or intravenous injection. Such compositions would normally be administered as pharmaceutically acceptable compositions. The active compounds may also be administered parenterally or intraperitoneally. Solutions of the active compounds as free base or pharmacologically acceptable salts can be prepared in water suitably mixed with a surfactant, such as hydroxypropylcellulose. Dispersions can also be prepared in glycerol, liquid polyethylene glycols, and mixtures thereof and in oils. Under ordinary conditions of storage and use, these preparations contain a preservative to prevent the growth of microorganisms.

The pharmaceutical forms suitable for injectable use include sterile aqueous solutions or dispersions and sterile powders for the extemporaneous preparation of sterile injectable solutions or dispersions. In all cases the form must be sterile and must be fluid to the extent that easy syringability exists. It must be stable under the conditions of manufacture and storage and must be preserved against the contaminating action of microorganisms, such as bacteria and fungi. The carrier can be a solvent or dispersion medium containing, for example, water, ethanol, polyol (for example, glycerol, propylene glycol, and liquid polyethylene glycol, and the like), suitable mixtures thereof, and vegetable oils. The proper fluidity can be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

Sterile injectable solutions are prepared by incorporating the active compounds in the required amount in the appropriate solvent with various other ingredients enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

As used herein, the phrase "pharmaceutically acceptable carrier" refers to any and all solvents, dispersion media, coatings, antibacterial and antifungal agents, isotonic and absorption delaying agents and the like. The use of such media and agents for pharmaceutical active substances is well known in the art. Except insofar as any conventional media or agent is incompatible with the active ingredient, its use in the therapeutic compositions is contemplated. Supplementary active ingredients can also be incorporated into the compositions.

For oral administration the polypeptides of the present invention may be incorporated with excipients and used in the form of non-ingestible mouthwashes and dentifrices. A mouthwash may be prepared incorporating the active ingredient in the required amount in an appropriate solvent, such as a sodium borate solution (Dobell's Solution). Alternatively, the active ingredient may be incorporated into an antiseptic wash containing sodium borate, glycerin and potassium bicarbonate. The active ingredient may also be dispersed in dentifrices, including: gels, pastes, powders and slurries. The active ingredient may be added in a therapeutically effective amount to a paste dentifrice that may include water, binders, abrasives, flavoring agents, foaming agents, and humectants.

Compositions for use with the present invention may be formulated in a neutral or salt form. Pharmaceutically-acceptable salts include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like. Upon formulation, solutions will be administered in a manner compatible with the dosage formulation and in such amount as is therapeutically effective. The formulations are easily administered in a variety of dosage forms such as injectable solutions, drug release capsules and the like. For parenteral administration in an aqueous solution, for example, the solution should be suitably buffered if necessary and the liquid diluent first rendered isotonic with sufficient saline or glucose. In this connection, sterile aqueous media, which can be employed will be known to those of skill in the art in light of the present disclosure. For example, one dosage could be dissolved in 1 ml of isotonic NaCl solution and either added to 1,000 ml of hypodermoclysis fluid or injected at the proposed site of infusion, (see for example, "Remington's Pharmaceutical Sciences," 15th Ed., 1035-1038 and 1570-1580), relevant portions incorporated by reference. Some variation in dosage will necessarily occur depending on the condition of the subject being treated. The person responsible for administration will, in any event, determine the appropriate dose for the individual subject. Moreover, for human administration, preparations should meet sterility, pyrogenicity, general safety, and purity standards as required by FDA Office of Biologics standards.

Kits. For use in the applications described herein, kits are also within the scope of the invention. Such kits can comprise a carrier, package or container that is compartmentalized to receive one or more containers such as vials, tubes, and the like, each of the container(s) comprising one of the separate elements to be used in the method, in particular, a Bright inhibitor. The kit of the invention will typically comprise the container described above and one or more other containers comprising materials desirable from a commercial end user standpoint, including buffers, diluents, filters, and package inserts with instructions for use. In addition, a label can be provided on the container to indicate that the composition is used for a specific therapeutic application, and can also indicate directions for either in vivo or in vitro use, such as those described above. Directions and or other information can also be included on an insert, which is included with the kit. In particular, kits according to the present invention contemplate the assemblage of agents for assessing levels of the biomarkers discussed above along with one or more of an SLE therapeutic and/or a reagent for ANA testing and/or anti-ENA, as well as controls for assessing the same.

Current biomarkers in lupus disease activity measures have limited utility for reflecting heightened clinical disease activity. They are neither the earliest, nor most informative, measurements of clinical disease activity. Although SLE-associated autoantibody specificities such as anti-dsDNA, anti-spliceosome and anti-Ro/SSA, accumulate in SLE patients years before classification, their presence is not sufficient to reflect clinical disease activity and risk for permanent organ damage. ANAs are also found in sera from patients with other systemic rheumatic diseases, and from healthy individuals who do not go on to develop SLE, including some unaffected family members of SLE patients, and up to 14% of the general population. Because individuals may remain healthy despite being ANA-positive, ANA positivity alone is likely not the sole pathogenic driver of SLE. In addition to ANA positivity, the dysregulation of various immune pathways driven by soluble mediators may contribute to clinical disease activity.

EXAMPLES

The following examples are included to further illustrate various aspects of the invention. It should be appreciated by those of skill in the art that the techniques disclosed in the examples, which follow, represent techniques and/or compositions discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

SLE is a complex autoimmune disease marked by immune dysregulation. A comprehensive but cost-effective tool to track relevant mediators of altered disease activity would help improve disease management and prevent organ damage. The goal of this example was to identify critical components of a practical biometric to distinguish active from low lupus disease activity.

The following examples demonstrate the determination of an optimal panel of markers that can distinguish those SLE patients with active disease and help to refine a Lupus Disease Activity Immune Index (LDAII). The refined LDAII developed from the following examples allows characterization of SLE patients with active clinical disease. Treatment to target using a sensitive and objective biologic surrogate for clinical disease activity could help improve disease management and prevent organ damage in SLE.

In these examples, 200 samples were procured from 150 patients classified with SLE on dates of low disease scores measured by the hybrid SLEDAI (hSLEDAI) (<4, range 0-3, n=100) or active disease (≥4, range 4-30, n=100). Race/sex/age-matched healthy control (Ctl) samples (n=50) were also evaluated. SLE-linked plasma immune mediators (n=35) were evaluated by Ella™ microfluidic immunoassay and serum SLE-associated AutoAb specificities, including dsDNA, chromatin, Ro/SSA, La/SSB, Sm, SmRNP, RNP, and ribosomal P, were assessed by Bioplex® 2200 xMAP assay. A subset of 24 log-transformed immune mediators were further evaluated using random forest applied machine learning modeling to determine an optimal subset of mediators to inform the LDAII. The LDAII is the sum of log-transformed, standardized immune mediators, weighted by the Spearman r correlation coefficient of immune mediator levels vs. either hSLEDAI scores or number of SLE-associated AutoAb specificities, which correlates with clinical disease activity (Spearman r=0.289, p<0.0001).

No difference in age, ethnicity, or sex was noted between low or active clinical disease. After adjusting for multiple comparisons (Bonferroni corrected p<0.0021), IFN-α, IL-2Rα, TNF-α, TNFRII, IP-10, MIG, and IL-10 remained significantly correlated with hSLEDAI scores (Spearman r=0.221-0.388), and 22/35 soluble mediators significantly correlated with accrued SLE-associated autoantibodies, including the top 12 LDAII informative mediators. Forward selection of the 24 mediators ranked by variable importance drew 12 mediators that best distinguished between controls, low disease and active disease. These top 12 immune mediators best informed and maximized the performance of a newly refined LDAII. The LDAII, weighted either by hSLEDAI score (p<0.0001) or number of AutoAb specificities (p=0.0060), significantly correlated with disease activity in SLE patients and identified patients with renal involvement (p<0.01), where SCF and TNFRII (p<0.0001) were significantly altered. In addition, the LDAII distinguished patients with dsDNA binding and low complement as well as clinically and serologically active vs. quiescent disease states (p<0.0001), differentiated by TNF-α, IL-2Rα, IP-10, and IL-10 levels (p≤0.001).

Materials and Methods

Study Population, Clinical Data, and Sample Collection

Experiments were performed in accordance with the Helsinki Declaration and approved by the Institutional Review Boards of the Oklahoma Medical Research Foundation and the University of Oklahoma Health Sciences Center. Undiluted plasma and serum samples were procured from 150, appropriately consented, SLE patients (meeting ≥4 ACR classification criteria) in the Oklahoma Rheumatic Disease Cohort and 50 race and sex-matched healthy individuals (Ctls) in the Oklahoma Immune Cohort, Table 1. Samples were stored at −80° in the Oklahoma Rheumatic Diseases Research Core Center (ORDRCC), CAP-certified, biorepository at OMRF. Samples in the biorepository have been tested with respect to shipment time and method, processing procedures, storage conditions, and length of storage for the ability to determine levels of soluble mediators and SLE-associated autoantibodies (AutoAbs) in samples from SLE patients and Ctls.

TABLE 1

Study Participant Demographics

| | SLE[a] | Healthy Control[b] | p-value[b] |
|---|---|---|---|
| # of individuals | 150 | 50 | — |
| Gender | | | 0.1219 |
| Female (%) | 136 (91%) | 49 (98%) | — |
| Race (n, %) | | | 0.4951 |
| European American | 62 (41%) | 26 (52%) | — |
| African American | 47 (31%) | 13 (26%) | — |
| American Indian | 24 (16%) | 8 (16%) | — |
| Asian | 17 (12%) | 3 (6%) | — |
| # of samples | 200 | 50 | — |
| Age at Draw (SD) | 38 (11) | 38 (12) | 0.8024 |

[a]SLE patients met ≥ 4 classification criteria for SLE (ACR and SLICC)
[b]Matched to SLE by Race, Gender, and Age
[c]Statistical significance (p ≤ 0.05) determined by paired t-test (continuous data) or Fisher's exact/χ² test (categorical data)

Demographic and clinical information were collected as previously described, including medication usage, clinical laboratory values, and clinical disease activity. The presence of organ system involvement was evaluated by the administration of the hybrid Systemic Lupus Erythematosus Disease Activity Index (hSLEDAI; SELENA-SLEDAI with proteinuria as defined by SLEDAI-2K), including the presence of disease manifestations involving the central nervous system (CNS; seizure, psychosis, organic brain syndrome, visual disturbance, cranial nerve disorder, or lupus headache), vasculitis, arthritis, myositis, nephritis (urinary casts, hematuria, proteinuria, or pyuria), mucocutaneous damage (rash, alopecia, or mucosal ulcers), serositis (pleuritis or pericarditis), or hematologic manifestations (low complement, increased DNA binding, fever, thrombocytopenia, or leukopenia). Patient visits with hSLEDAI scores <4 were as "low" disease activity (n=100), while patient visits with hSLEDAI scores ≥4 were considered as "active" disease (n=100), Table 2. Blood samples were procured from each participant at each clinical visit. Plasma and serum samples were stored at −20° C. until time of assay. Assays were performed on freshly thawed samples.

TABLE 2

SLE Patient AutoAntibody, Medication, and Clinical Characteristics

| Disease Activity[a]: | Low | Active | p-value[b] |
|---|---|---|---|
| # of visits/samples | 100 | 100 | — |
| Age at Draw (SD) | 45 (13) | 41 (12) | 0.2814 |
| # Positive AutoAb Specificities (Range) | 2.2 (0-6) | 2.9 (0-6) | 0.0006 |
| AutoAb Specificities, # (%)[e] | | | |
| dsDNA | 18 (18%) | 45 (45%) | <0.0001 |
| Chromatin | 41 (42%) | 63 (64%) | 0.0027 |
| Ro/SSA | 37 (38%) | 40 (40%) | 0.7707 |
| La/SSB | 5 (5%) | 11 (11%) | 0.1911 |
| Sm | 27 (28%) | 37 (37%) | 0.1712 |
| SmRNP | 41 (42%) | 48 (48%) | 0.3914 |
| RNP | 43 (44%) | 45 (45%) | 0.8863 |
| Medications at Draw, # (%) | | | |
| Steroids | 42 (42%) | 63 (63%) | <0.0001 |
| Hydroxychloroquine | 66 (66%) | 64 (64%) | 0.8822 |
| Immunosuppressants[c] | 41 (41%) | 29 (29%) | 0.1026 |
| Major Immunosuppressants[d] | 17 (17%) | 27 (27%) | 0.1239 |
| hSLEDAI score (Range) | 1.1 (0-3) | 9.7 (4-30) | <0.0001 |
| hSLEDAI organ system manifestations: n positive (%) | | | |
| CNS[f] | 0 | 0 | — |
| Vasculitis | 0 | 18 (18%) | <0.0001 |
| Arthritis | 0 | 43 (43%) | <0.0001 |
| Myositis | 0 | 0 | — |
| Renal[g] | 0 | 32 (32%) | <0.0001 |
| Mucocutaneous[h] | 13 (13%) | 60 (60%) | <0.0001 |
| Serositis[i] | 2 (2%) | 20 (20%) | <0.0001 |
| Serologic[j] | 38 (38%) | 62 (62%) | 0.0011 |
| Fever | 0 | 6 (6%) | 0.0289 |
| Hematalogic[k] | 4 (4%) | 9 (9%) | 0.2507 |

[a]Low = hSLEDAI < 4; Active = hSLEDAI ≥ 4
[b]Statistical significance (p ≤ 0.05) determined by paired t-test (continuous data) or Fisher's exact test (categorical data)
[c]Immunosuppressants = methotrexate, azathioprine
[d]Major immunosuppressants = mycophenolate mofetil, cyclophosphamide
[e]determined by Bioplex ® 2200 ANA Screen (n = 98 "Low" samples; n = 99 "Active" samples)
[f]CNS = seizure, psychosis, organic brain syndrome, visual disturbance, cranial nerve dosirder, lupus headache, CVA
[g]Renal = urinary casts, hematuria, proteinuria, pyuria
[h]Mucocutaneous = rash, alopecia, mucosal ulcers
[i]Serositis = pleurisy, pericarditis
[j]Serologic = low complement, increased DNA binding
[k]Hematologic = thrombocytopenia, leukopenia Measurement of Soluble Mediators and Autoantibody Specificities Serum samples were screened for autoantibody specificities using the BioPlex 2200 multiplex system (Bio-Rad Technologies, Hercules, CA), Table 2. The BioPlex 2200 ANA kit uses fluorescently dyed magnetic beads for simultaneous detection of 11 autoantibody specificity levels, including reactivity to dsDNA, chromatin, ribosomal P, Ro/SSA, La/SSB, Sm, the Si/RNP complex, RNP. Sci-70, centromere B, and Jo-1. SLE-associated autoantibody specificities to dsDNA, chromatin, Ro/SSA, La/SSB, Sm, Sm/RNP complex, and RNP were used for analysis in the current study. Anti-dsDNA (IU/mL) has a previously determined positive cutoff of 10 IU/mL; an Antibody Index (AI) value (range 0-8) is reported by the manufacturer to reflect the fluorescence intensity of each of the other autoantibody specificities with a positive cutoff of AI=1.0. The AI scale is standardized relative to calibrators and control samples provided by the manufacturer.

35 soluble mediators were selected for assessment in this confirmatory cohort study (Table 3). Plasma soluble mediators assessed included cytokines, chemokines, and soluble receptors. Equal numbers of paired low/active disease SLE samples and their appropriate race/sex/age-matched controls were assessed on each assay cartridge set (35 mediators were assessed across a single lot of seven, custom-designed, single/multi-analyte cartridges, per manufacturer's recommendation). In addition, at least two races were represented on each cartridge set, and no race was assessed on only one cartridge set in order to achieve equal distribution and limit batch effects within the dataset.

TABLE 3

SLE-associated soluble mediators assessed

| Innate | Th1-like | TNFR Superfamily |
|---|---|---|
| IL-1α** | IL-12 (p70) | BLyS |
| IL-1β | IFN-γ | Fas |
| IL-1RA | IL-2** | TNF-α |
| IFN-α | IL-2Rα | TNFRI (p55) |
|  |  | TNFRII (p75) |
|  |  | TRAIL |

| Homeostasis | Th-17 like |
|---|---|
| IL-7 | IL-6 |
| IL-15 | IL-17A |

| Other | Th2-like | Chemokines/Adhesion molecules |
|---|---|---|
| Osteopontin | IL-4 | MCP-1/CCL2 |
| Resistin | IL-5 | MIP-1α/CCL3 |
| SCF | IL-13 | MIP-1β/CCL4 |
|  |  | RANTES/CCL5 |
|  |  | MCP-3/CCL7 |
|  |  | IL-8/CXCL8 |
|  |  | MIG/CXCL9 |
|  |  | IP-10/CXCL10 |

| Regulatory |
|---|
| IL-10 |
| Total TGF-β |
| Native TGF-β |

**Analytes with > 60% samples < LLOQ

Manufacturer-provided Lo/Med/Hi quality control (QC) samples for each measured analyte were assessed alongside SLE and healthy individual plasma samples on each assay cartridge, per manufacturer SOP protocol. These QC samples were prepared, as directed, just prior to performance of the cartridge assay in the Ella machine. Because only two cartridges (of seven) could be assessed at any given time, in addition, a thaw control was added such that a QC sample in concentration range of the plasma samples assessed was thawed and handled concurrently with the plasma samples to be assessed per SOP protocol. The mean Coefficient of Variation (CV) for the QC/Thaw samples in all analytes assessed was <11% (13 of 35 had CV <5%) across the nine sets of seven cartridges required to assess 250 plasma samples plus QC/Thaw controls. All Lo/Med/Hi and Thaw control QC samples reported within manufacturer specified concentration range for each analyte. In addition, the Thaw control QC sample was within 10% (26 of 35 analytes within 5%) of the matched QC sample concentration for each analyte that prepared just before assay, indicating minimal effect of time to assay on the Ella cartridges/samples.

Samples with concentration <LLOQ were assigned a value of 0.001 pg/ml and a de-identified dataset containing demographic (race, sex, age), clinical (disease activity, medications, co-morbidities), and biological (soluble mediator, AutoAb specificities) data for subsequent sub-analyses was generated for univariate and multivariable analysis. IL-2 and IL-1α were excluded from univariate and multivariable analysis due to >60% of the plasma sample concentrations having values <LLOQ (0.001 pg/ml).

Statistical Analyses

Categorical variables were compared by Fisher's exact test. Disease activity scores in low vs. active disease clinical visits were compared using unpaired t-test. Number of autoantibody specificities and plasma soluble mediator concentrations were compared between SLE patient visits with low or active disease by Mann-Whitney test. Plasma mediator concentrations and number of autoantibody specificities were compared between SLE patient visits with low and active disease and race/sex matched Ctl samples by Kruskal-Wallis test with Dunn's multiple comparison. Plasma mediator concentrations were correlated with hSLEDAI scores or number of autoantibody specificities by Spearman's rank correlation. Except where noted, analyses were performed using GraphPad Prism 6.02 (GraphPad Software, San Diego, CA).

Of the 33 soluble mediators designated for univariate analysis (Table 4), 24 were selected for multivariable analysis. IL-10, IL-12p70, IL-4, and IL-5 were dropped from multivariable analysis due to low levels of detection. IL-1RA, IL-17A, IL-13, MIP-1α, and MIP-1β were not included in multivariable analysis due to lack of univariate analysis significance after adjusting for multiple comparison. To determine variable importance of the remaining mediators to distinguish between healthy individuals vs. SLE patients with low or active clinical disease, random forest (RF) was performed 2000 times utilizing randomly selected ⅔ vs ⅓ splits of the data as previously described. Forward selection (maximum of 12 analytes) was applied to the Lupus Disease Activity Immune Index (LDAII), described below.

TABLE 4

Plasma Soluble Mediator Levels in SLE Case vs. Ctl Samples

| Analyte[a] | Category | Case Mean | SEM | Active[b] Mean | SEM | Low[b] Mean | SEM | Ctl Mean | SEM | Case vs Ctl p-value[c] | Active vs Ctl p-value[c] | Low vs Ctl p-value[c] | Active vs Low p-value[c] |
|---|---|---|---|---|---|---|---|---|---|---|---|---|---|
| IL-1β | Innate | 0.31 | 0.04 | 0.27 | 0.03 | 0.34 | 0.07 | 0.75 | 0.24 | 0.0175 | 0.0132 | 0.0275 | 0.6173 |
| IL-1RA | Innate | 675 | 87 | 796 | 160 | 554 | 66 | 430 | 58 | 0.0034 | 0.0030 | 0.0179 | 0.0802 |
| IFN-α | Innate | 3.7 | 0.6 | 5.8 | 1.2 | 1.6 | 0.3 | 0.5 | 0.1 | <0.0001 | <0.0001 | <0.0001 | <0.0001 |
| IL-7 | Homeostasis | 7.6 | 0.2 | 7.8 | 0.4 | 7.4 | 0.3 | 6.5 | 0.7 | 0.0003 | 0.0011 | 0.0009 | 0.3497 |
| IL-15 | Homeostasis | 7.3 | 1.1 | 9.4 | 2.2 | 5.3 | 0.7 | 2.1 | 0.2 | <0.0001 | <0.0001 | <0.0001 | 0.1881 |
| IL-12(p70) | Th1-like | 0.68 | 0.06 | 0.78 | 0.1 | 0.58 | 0.06 | 0.7 | 0.06 | 0.0609 | 0.2987 | 0.0173 | 0.2987 |
| IFN-γ | Th1-like | 3.3 | 0.8 | 3.8 | 1.4 | 2.7 | 0.8 | 1 | 0.3 | <0.0001 | <0.0001 | <0.0001 | 0.0471 |
| IL-2Rα | Th1-like | 1951 | 70 | 2127 | 110 | 1775 | 84 | 1062 | 54 | <0.0001 | <0.0001 | <0.0001 | 0.0013 |
| IL-6 | Th17-like | 7.4 | 1.1 | 9.5 | 2.1 | 5.4 | 0.6 | 2.8 | 0.4 | <0.0001 | <0.0001 | 0.0006 | 0.0094 |
| IL-17A | Th17-like | 4.5 | 0.1 | 4.6 | 0.2 | 4.4 | 0.2 | 4.6 | 0.3 | 0.5211 | 0.9533 | 0.2666 | 0.0423 |
| IL-4 | Th2-like | 0.18 | 0.03 | 0.20 | 0.06 | 0.17 | 0.02 | 0.18 | 0.02 | 0.0507 | 0.0272 | 0.1820 | 0.4362 |
| IL-5 | Th2-like | 0.47 | 0.04 | 0.53 | 0.07 | 0.41 | 0.05 | 0.59 | 0.26 | 0.0076 | 0.0016 | 0.0971 | 0.0015 |
| IL-13 | Th2-like | 11.6 | 1.5 | 11.2 | 2.1 | 11.9 | 2.2 | 34.9 | 19.7 | 0.0236 | 0.5490 | 0.3392 | 0.2945 |
| IL-10 | Th2-like/Regulatory | 5.3 | 0.3 | 6.0 | 0.5 | 4.5 | 0.4 | 1.9 | 0.1 | <0.0001 | <0.0001 | <0.0001 | 0.0007 |
| Total TGF-β | Regulatory | 10662 | 589 | 10813 | 887 | 10511 | 778 | 13295 | 1276 | 0.0122 | 0.0224 | 0.0225 | 0.5015 |
| Native TGF-β | Regulatory | 12.4 | 3.3 | 11.1 | 3.9 | 13.6 | 5.3 | 21.7 | 3.9 | <0.0001 | <0.0001 | <0.0001 | 0.6939 |
| BLyS | TNF Superfamily | 1295 | 62 | 1383 | 94 | 1208 | 80 | 623 | 21 | <0.0001 | <0.0001 | <0.0001 | 0.0425 |
| Fas | TNF Superfamily | 14378 | 366 | 15080 | 517 | 13676 | 511 | 9583 | 380 | <0.0001 | <0.0001 | <0.0001 | 0.0185 |
| TNF-α | TNF Superfamily | 14.5 | 0.8 | 16.2 | 1.3 | 12.8 | 1.0 | 10.8 | 2.9 | <0.0001 | <0.0001 | <0.0001 | 0.0023 |
| TNFRI (p55) | TNF Superfamily | 2035 | 166 | 2124 | 187 | 1946 | 276 | 961 | 41 | <0.0001 | <0.0001 | <0.0001 | 0.0067 |
| TNFRII (p75) | TNF Superfamily | 4754 | 395 | 4916 | 328 | 4592 | 720 | 2071 | 84 | <0.0001 | <0.0001 | <0.0001 | 0.0007 |
| TRAIL | TNF Superfamily | 82.4 | 2.4 | 82.5 | 3.4 | 82.2 | 3.5 | 60.7 | 3.3 | <0.0001 | <0.0001 | <0.0001 | 0.7980 |
| MCP-1/CCL2 | Chemokines | 450 | 36 | 513 | 65 | 388 | 28 | 195 | 11 | <0.0001 | <0.0001 | <0.0001 | 0.0350 |
| MIP-1α/CCL3 | Chemokines | 45.7 | 4.7 | 41.9 | 4.3 | 49.5 | 8.4 | 34.9 | 9.6 | 0.0006 | 0.0002 | 0.0116 | 0.1415 |
| MIP-1β/CCL4 | Chemokines | 140 | 25 | 122 | 29 | 158 | 40 | 64 | 23 | 0.0330 | 0.0111 | 0.1775 | 0.3969 |
| RANTES/CCL5 | Chemokines | 14959 | 745 | 14267 | 1044 | 15651 | 1064 | 23251 | 2798 | 0.0191 | 0.0763 | 0.2494 | 0.3597 |
| MCP-3/CCL7 | Chemokines | 15 | 6 | 19.4 | 10.9 | 10.7 | 4.9 | 2.9 | 0.8 | <0.0001 | <0.0001 | <0.0001 | 0.0178 |
| IL-8/CXCL8 | Chemokines | 19.6 | 3.9 | 22.4 | 5.5 | 16.8 | 5.7 | 31.6 | 8.6 | 0.0013 | 0.0010 | 0.0102 | 0.0344 |
| MIG/CXCL9 | Chemokines | 989 | 165 | 1093 | 270 | 885 | 190 | 782 | 116 | <0.0001 | <0.0001 | <0.0001 | 0.0081 |
| IP-10/CXCL10 | Chemokines | 417 | 48 | 500 | 84 | 334 | 47 | 130 | 16 | <0.0001 | <0.0001 | <0.0001 | 0.0015 |
| Osteopontin | Other/Inflammatory | 142401 | 26008 | 169844 | 50532 | 114957 | 12278 | 45203 | 3485 | <0.0001 | <0.0001 | <0.0001 | 0.0929 |
| Resistin | Other/Inflammatory | 14457 | 856 | 15990 | 1460 | 12924 | 875 | 10155 | 555 | 0.0088 | 0.0014 | 0.1130 | 0.0056 |
| SCF | Other/Inflammatory | 1514 | 61 | 1565 | 83 | 1462 | 88 | 875 | 31 | <0.0001 | <0.0001 | <0.0001 | 0.1515 |

[a]Soluble mediator concentration in pg/ml (Mean and SEM) in 200 SLE Cases vs. 50 race/sex/age-matched Healthy Controls (Ctl)
[b]Low = hSLEDAI < 4 (n = 100); Active = hSLEDAI ≥ 4 (n = 100)
[c]Significance determined by Mann-Whitney test; Bonferroni corrected significance p = 0.0015

A Lupus Disease Activity Immune Index (LDAII) calculation was developed to compare the overall level of inflammation during patient visits with varying levels of disease activity, distinguished from Ctls. The LDAII summarizes the dysregulation of all 33 plasma mediators assessed in SLE patients at clinic visits with low and active disease and matched Ctls, weighted by their correlation to the number of AutoAb specificities detected from samples procured at the same visit. The LDAII was calculated as follows: 1. The concentrations of all 33 baseline plasma mediators selected for statistical analysis, Table 4, were log-transformed for each SLE patient or Ctl visit. 2. Each log-transformed soluble mediator level for each participant visit was standardized: (observed value)−(mean value of all SLE patient and Ctl visits)/(standard deviation of all SLE patient and Ctl visits) 3. Spearman coefficients were generated from a linear regression model testing associations between the number of AutoAb specificities each soluble mediator assessed in all SLE patient and Ctl visits, with alternate associations between hSLEDAI scores and each soluble mediator assessed in all SLE patient visits (Spearman r); 4. The transformed and standardized soluble mediator levels at were weighted (multiplied) by their respective Spearman coefficients (Spearman r). 5. For each participant visit, the log transformed, standardized and weighted values for each soluble mediator informing the LDAII were summed to calculate a total LDAII.

The LDAII was compared between SLE patient visits with low and active disease by Mann-Whitney test, and additionally to Ctls by Kruskal-Wallis test with Dunn's multiple comparison. Odds ratio (OR) was determined for the likelihood of SLE patient visits with active disease vs. low disease activity (or Ctl) to have a positive or negative LDAII score, respectively; significance for was determined by Fisher's exact test.
Results
Increased Number of AutoAb Specificities and Altered Levels of Select Mediators with Clinically Active Disease Patients who transition to classified SLE (meeting ≥4 ACR classification criteria) exhibit multiple levels of immune dysregulation, including accumulation of SLE-associated AutoAb specificities and alteration of both inflammatory and regulatory soluble mediators. Based on the hypothesis that such immune dysregulation would also be reflected in SLE patients with clinically active disease, serum autoantibody and plasma soluble mediator profiles were compared in samples procured during clinic visits whereby 150 SLE patients exhibited low disease activity (hSLEDAI<4, range 0-3, n=100) or active disease (hSLEDAI≥4, range 4-30, n=100), Table 2. As expected, SLE patients with active disease had significantly higher hSLE-DAI scores and were more likely to exhibit various organ system manifestations than SLE patients with low disease activity. In addition, SLE patients with active disease exhibited a significant increase in the number of SLE-associated AutoAb specificities compared to the number detected during low disease activity (p=0.0006). AutoAbs against dsDNA (p<0.0001) and chromatin (p=0.0027) were more likely to be positive during periods of active disease, while the frequency of Ro/SSA, La/SSB, Sm, SmRNP, and RNP AutoAb specificities were similar in low and active disease, Table 2. SLE patients with active disease were more likely to be prescribed steroids (p<0.0001) and similarly prescribed hydroxychloroquine and/or immunosuppressants as patients with low disease activity, Table 2.

Whether SLE patients with active disease also had alterations in SLE-associated soluble mediators was also evaluated, as shown in Table 4. After adjusting for multiple comparison (Bonferroni corrected significance p=0.0015), plasma levels of 19 mediators were significantly altered in SLE patients compared to matched HC, irrespective of SLE clinical disease activity, including innate, adaptive, chemokine, and other inflammatory mediators. Three mediators, MIP-1α/CCL3 (p=0.0002), IL-8/CXCL8 (p=0.0010), and Resistin (p=0.0014), were more likely to be elevated in SLE patients with active disease vs. HC, while IL-7 (p=0.0009) uniquely distinguished SLE patients with low disease activity from HC. Six select soluble mediators, including IFN-α (p<0.0001), IL-2Rα (p=0.0013), IL-5 (p=0.0015), IL-10 (p=0.0007), TNFRII (p=0.0007), and IP-10/CXCL10 (p=0.0015) were elevated in SLE patients with active disease compared to those with low clinical disease activity; 12 other mediators also displayed univariate significance, but were no longer significant after correction for multiple comparison, Table 4. These data indicate that a number of select mediators may be altered in direct association with clinically active SLE.

Soluble Mediator Levels are Altered in Association with the Presence of AutoAbs and Clinical Disease Activity Multiple additional soluble mediators (22/35 assessed) significantly (p≤0.0017 with multiple comparison correction) correlated with the number of accumulated SLE-associated AutoAbs present in SLE patients and matched healthy controls, including innate and adaptive mediators, chemokines, and TNF superfamily members. Of interest, the native form of the regulatory mediator, TGF-β, negatively correlated with the presence of AutoAb specificities (Spearman r=−0.235, p=0.0002). Conversely, IL-10, which can serve as both a regulatory mediator and an activator of B-lymphocytes, positively correlated with the accumulation of AutoAb specificities (r=0.494, p<0.0001).

TABLE 5

Plasma Mediators Correlate with # of SLE-Associated AutoAb Specificities

| Mediator | Spearman r | 95% CI | p value[a] | Mediator | Spearman r | 95% CI | p value[a] |
|---|---|---|---|---|---|---|---|
| IP-10 | 0.509 | 0.407 to 0.599 | <0.0001 | MIG | 0.346 | 0.227 to 0.454 | <0.0001 |
| IFN-α | 0.495 | 0.391 to 0.587 | <0.0001 | Fas | 0.345 | 0.226 to 0.454 | <0.0001 |
| IL-10 | 0.494 | 0.390 to 0.586 | <0.0001 | MIP-1α | 0.299 | 0.177 to 0.412 | <0.0001 |
| BLyS | 0.487 | 0.382 to 0.579 | <0.0001 | TNFRI | 0.299 | 0.177 to 0.412 | <0.0001 |
| IL-15 | 0.477 | 0.371 to 0.571 | <0.0001 | SCF | 0.293 | 0.171 to 0.407 | <0.0001 |
| TNFRII | 0.477 | 0.371 to 0.571 | <0.0001 | TRAIL | 0.271 | 0.147 to 0.386 | <0.0001 |
| TNF-α | 0.453 | 0.344 to 0.550 | <0.0001 | MIP-1β | 0.264 | 0.140 to 0.380 | <0.0001 |
| IL-2Rα | 0.441 | 0.331 to 0.539 | <0.0001 | MCP-3 | 0.225 | 0.099 to 0.343 | 0.0004 |
| MCP-1 | 0.430 | 0.318 to 0.418 | <0.0001 | IL-8 | 0.199 | 0.072 to 0.319 | 0.0017 |
| IFN-γ | 0.386 | 0.270 to 0.490 | <0.0001 | IL-17A | 0.158 | 0.030 to 0.281 | 0.0130 |
| IL-7 | 0.359 | 0.242 to 0.466 | <0.0001 | IL-6 | 0.153 | 0.025 to 0.276 | 0.0163 |
| OPN | 0.346 | 0.228 to 0.455 | <0.0001 | Native TGF-β | −0.235 | −0.353 to −0.110 | 0.0002 |

[a]Spearman correlation, Bonferroni corrected significance p = 0.0021

A more distinct set of biomarkers directly correlates with clinical disease activity (hSLEDAI score, Table 6). In addition to AutoAb accumulation (r=0.289), six mediators significantly correlated with hSLEDAI scores after multiple comparison correction (Bonferonni corrected p=0.0025), including IFN-associated mediators IFN-α (r=0.388) and IP-10/CXCL10 (r=0.262), TNF superfamily members TNF-α (r=0.264) and TNFRII (r=0.283), as well as activating mediators IL-10 (r=0.265) and IL-2Rα (r=0.238). Fourteen additional soluble mediators, including IFNs, TNF mediators, and chemokines, were initially found to be significant prior to correcting for multiple comparisons, Table 6.

TABLE 6

Distinct Plasma Mediators Correlate with Disease Activity

| Mediator | Spearman r | 95% CI | p value[a] | Mediator | Spearman r | 95% CI | p value[a] |
|---|---|---|---|---|---|---|---|
| IFN-α | 0.388 | 0.259 to 0.503 | <0.0001 | BLyS | 0.1820 | 0.041 to 0.317 | 0.0098 |
| # AutoAbs | 0.289 | 0.151 to 0.416 | <0.0001 | IL-8 | 0.185 | 0.043 to 0.319 | 0.0087 |
| TNFRII | 0.283 | 0.149 to 0.409 | <0.0001 | Fas | 0.185 | 0.043 to 0.319 | 0.0088 |
| IL-10 | 0.265 | 0.127 to 0.393 | 0.0001 | MIP-1β | 0.184 | 0.042 to 0.318 | 0.0092 |
| TNF-α | 0.264 | 0.126 to 0.392 | 0.0002 | IFN-γ | 0.181 | 0.039 to 0.315 | 0.0105 |
| IP-10 | 0.262 | 0.123 to 0.390 | 0.0002 | IL-15 | 0.167 | 0.025 to 0.303 | 0.0181 |
| IL-2Rα | 0.238 | 0.098 to 0.368 | 0.0007 | OPN | 0.154 | 0.011 to 0.290 | 0.0285 |
| MIG | 0.221 | 0.081 to 0.353 | 0.0016 | MCP-1 | 0.155 | 0.012 to 0.291 | 0.0285 |
| TNFRI | 0.197 | 0.056 to 0.330 | 0.0052 | IL-1RA | 0.142 | −0.001 to 0.279 | 0.0445 |
| MIP-1α | 0.191 | 0.049 to 0.325 | 0.0069 | IL-17A | 0.140 | −0.003 to 0.277 | 0.0487 |

[a]Spearman correlation, Bonferroni corrected significance p = 0.0025

A Weighted Lupus Disease Activity Immune Index (LDAII) Differentiates Active Disease in SLE Patients Given the significant alterations in multiple immune pathways associated with active clinical disease in SLE patients, the Lupus Disease Activity Immune Index (LDAII) disclosed herein summarizes the immune dysregulation in individual patients, comparing low and active disease in SLE patients vs. the immune profile found in healthy individuals (Ctls), FIG. 1. The LDAII is calculated using log-transformed, normalized levels of each soluble mediator weighted based on their correlations to the number of SLE-associated AutoAb specificities detected. The sum of the weighted, log-transformed, normalized levels for each analyte produces the global LDAII (please see Materials and Methods for details). A distinct advantage of this approach is that it does not require cut-offs for each cytokine/chemokine to establish positivity, and gives impact to those untransformed mediators with stronger (Spearman) correlations to accumulation of AutoAb specificities that would be found in SLE patients with active disease. The LDAII (calculated as a total of sub-scores contributed by each soluble mediator), incorporating all 33 soluble mediators assessed, was significantly higher in SLE patients with active clinical disease compared to SLE patients with low disease activity and Ctl samples (FIG. 1A). Including healthy individuals in the algorithm allows for optimal differentiation of SLE patients with low disease activity. Importantly, the LDAII weighted by AutoAb accumulation significantly correlated with hSLEDAI scores (r=0.290, p<0.0001) and differentiated SLE patients with active disease or low disease activity vs. Ctl (AUC=0.907, p<0.0001). Given that the LDAII is meant to complement and characterize clinical disease activity, the LDAII was weighted by the Spearman correlation between hSLEDAI scores in SLE patients and immune mediator levels, FIG. 1B. Once again the hSLEDAI-weighted LDAII informed by 33 soluble mediators was able to differentiate SLE patients with low or active disease from matched healthy individuals (AUC=0.885, p<0.0001).

Figure 2:
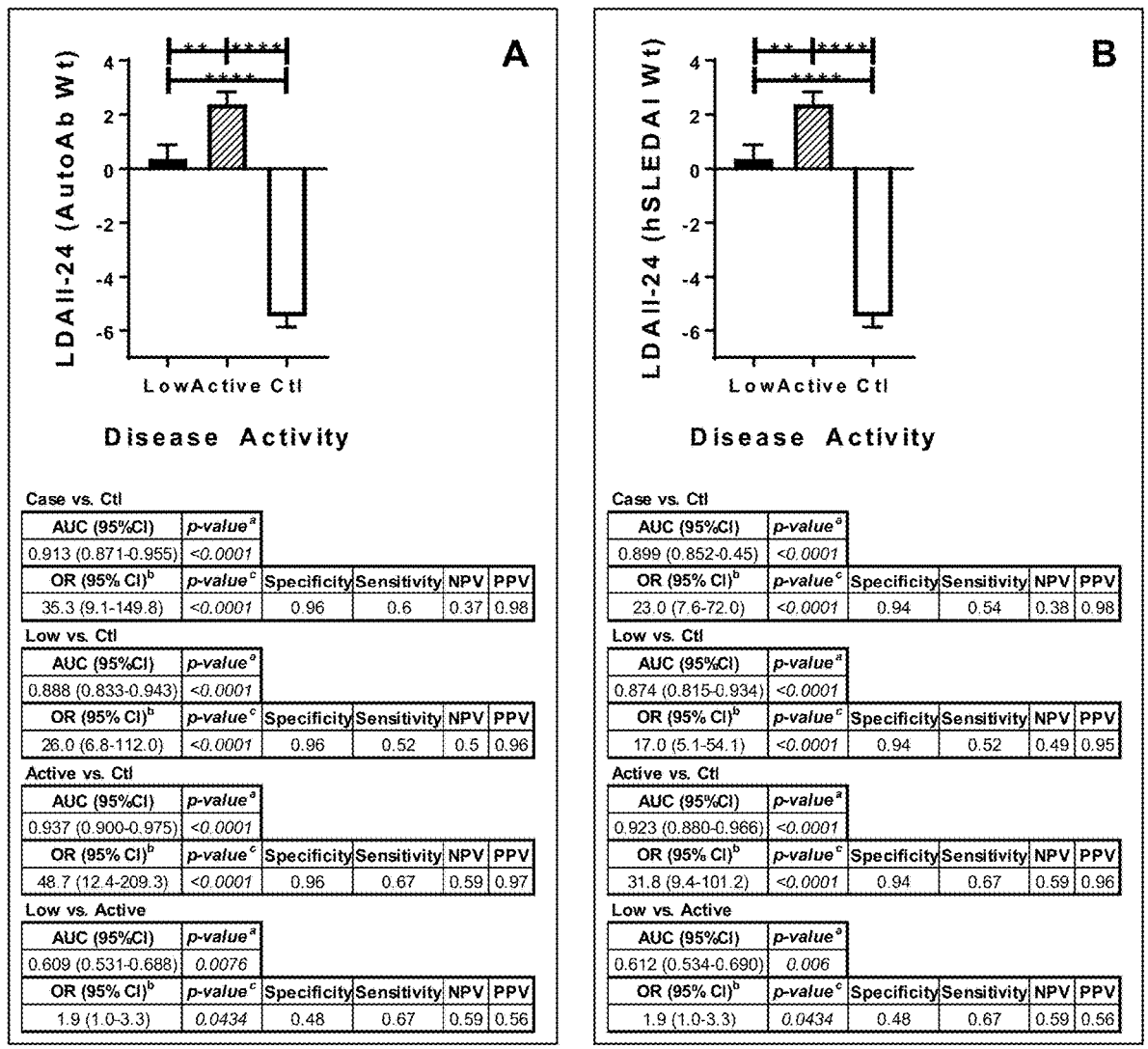
FIG. 2. Lupus Disease Activity Immune Index (LDAII), informed by 24 mediators (LDAII-24) and weighted either by #AutoAb specificities (A) or hSLEDAI score (B) differentiates SLE patients with low (hSLEDAI<4) or active (hSLEDAI≥4) disease from race/gender/age-matched healthy individuals (Ctl). Log-transformed, standardized data for each soluble mediator in SLE patients and Ctls was weighted by the Spearman r comparing soluble mediator levels vs. number of SLE-associated AutoAb specificities present (A) or hSLEDAI score (B). Mean LDAII-24±SEM shown in graphs. p<0.01; **p<0.0001 by Kruskal Wallis with Dunn's Multiple Comparison; $^a$Receiver Operating Characteristic (ROC) curve; AUC=Area under the ROC curve; $^b$Odds Ratio (# of Low vs Active Disease with Positive or Negative LDAII-24); $^c$Fisher's Exact test.

The LDAII was informed with only 24 mediators that significantly differentiated SLE patients with low or active clinical disease and matched healthy individuals after correcting for multiple comparison, Table 4. Weighting the LDAII-24 based on either AutoAb accumulation, FIG. 2a, or clinical disease activity, FIG. 2b, improved the ability to differentiate between SLE patients with low or active disease vs. healthy controls (AUC=0.913, p<0.0001, FIG. 2a; AUC=0.889, p<0.0001, FIG. 2b). These data suggest that additional immune dysregulation is associated with clinical disease activity, and this heterogeneous dysregulation can be harnessed to form an LDAII with the potential to impact clinical care.

The LDAII differentiates SLE patients with Clinically and Serologically Active and Quiescent disease.

Figure 3:
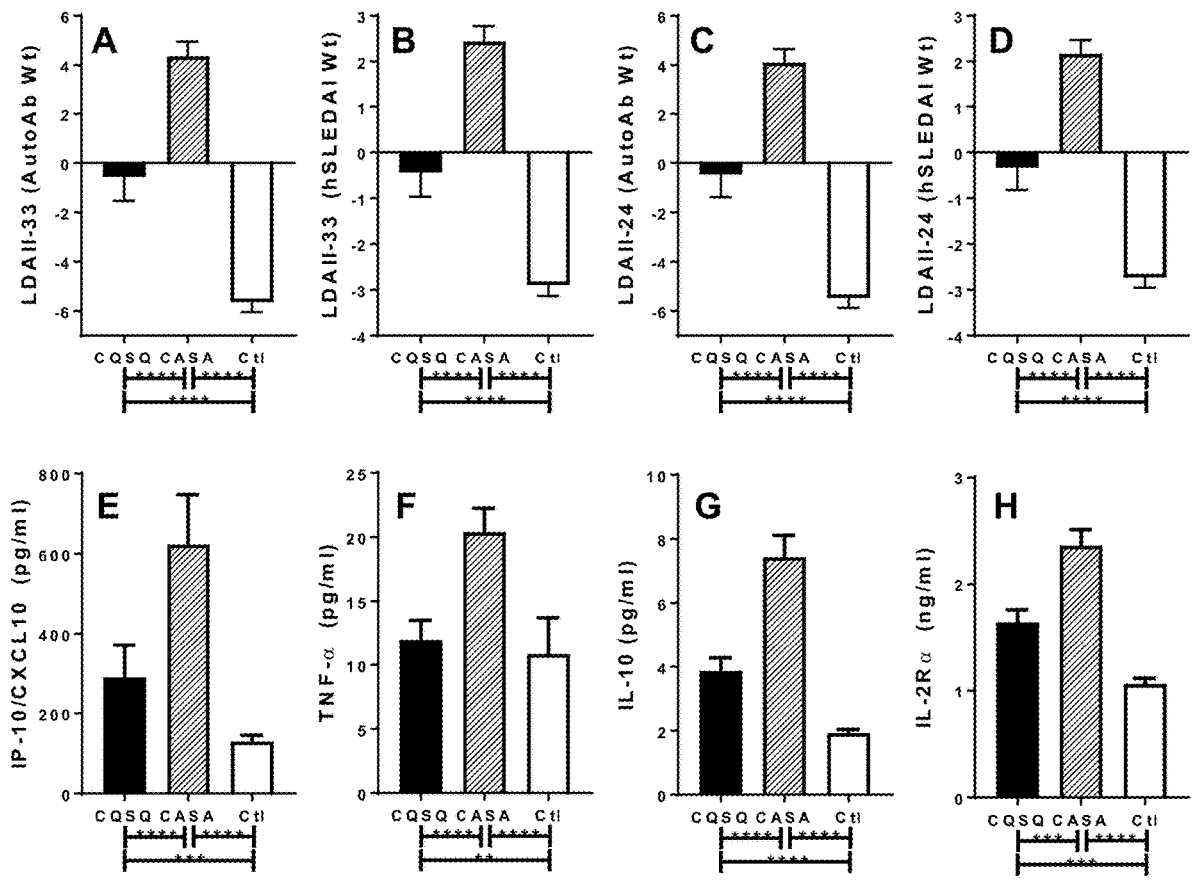
FIG. 3. LDAII informed by 33 mediators (LDAII-33, A-B) and LDAII informed by 24 mediators (C-D) weighted either by #AutoAb specificities (A,C) or hSLEDAI score (B,D) differentiates SLE patients with clinically/serologically quiescent (CQSQ) from active (CASA) and matched healthy individuals (Ctl). Plasma mediators were also compared for these SLE patient/Ctl groups, including IP-10/CXCL10 (E), TNF-α (F), IL-10 (G), and IL-2Rα (H). Mean±SEM shown in graphs. p<0.01; *p<0.001; ****p<0.0001 by Kruskal Wallis with Dunn's Multiple Comparison.

Also evaluated was whether or not the LDAII, informed by either 33 or 24 mediators, could differentiate clinically active (CA) vs. quiescent (CQ) disease in combination with serologically active (SA) vs. quiescent disease (SQ), which is defined as meeting Immunologic disease activity criteria (anti-dsDNA binding AutoAbs and/or low complement levels) vs. Ctls (FIG. 3). Those SLE patients who had clinically active disease (CASA) had significantly higher LDAII-33 and LDAII-24 scores than patients with clinically quiescent disease (CQSQ), irrespective of weighting by AutoAb accumulation or clinical disease activity, FIGS. 8A-AD. In addition, increased levels of mediators in CASA SLE patients (p<0.01) were observed, including IP-10/CXCL10 (FIG. 3E), TNF-α (FIG. 3F), IL-10 (FIG. 3G), and IL-2Rα (FIG. 3H). Of interest, many CQSQ patients still have inflammatory mediators that are higher than Ctls, despite being both clinically and serologically quiescent.

The LDAII Differentiates Clinically Active Disease in European American and Minority SLE Patients Minority SLE patients are more likely to reach disease classification sooner, with greater pre-existing organ damage and increased risk of damage accrual than European American (EA) patients. Both LDAII-33, as well as LDAII-24, irrespective of weighting by AutoAb accumulation or clinical disease activity, were able to differentiate SLE patients with low vs. active clinical disease, as well as healthy controls in both EA and non-EA individuals (FIG. 4A-D). Of interest is that the non-EA individuals had higher LDAII scores, particularly SLE patients, irrespective of disease activity status. Increased LDAII-33 and LDAII-24 in non-EA SLE patients were associated with enhanced levels of select mediators. Plasma levels of IFN-α (FIG. 4E), IP-10/CXCL10 (FIG. 4F), IL-6 (FIG. 4G), and TNF-α (FIG. 4H) were enhanced in non-EA SLE patients, as well as matched healthy controls. These data suggest that enhanced immune dysregulation in non-EA SLE patients may be associated with increased clinical disease activity and risk of damage accrual.

The LDAII Differentiates SLE Patients with Renal Organ Manifestations of Disease Activity Chronic immune dysregulation, including pathogenic autoantibody production and increased levels of inflammatory mediators, contributes to progressive end-organ damage. Kidney damage and lupus nephritis are among most severe sequelae of SLE, contributing substantially to SLE-related morbidity and mortality. Early detection and treatment of kidney damage are imperative to minimize the risk of permanent organ damage and to preserve renal function. Therefore, whether LDAII-33 and LDAII-24 could differentiate SLE patients with renal involvement (FIG. 5), which was present in SLE patients with active disease (Table 2), was also assessed. SLE patients with active disease and renal manifestations had significantly higher LDAII scores than SLE patients with active disease without renal manifestations (p=0.0099), FIG. 9A. SLE patients with active disease with renal manifestation had higher LDAII scores than SLE patients with low disease activity, irrespective of LDAII weighting (FIGS. 5A-D). Both TNFRII (FIG. 5E) and SCF (FIG. 5F) were increased is SLE patients with active disease and renal manifestation compared to those patients not exhibiting renal manifestations of disease activity. These data suggest that harnessing immune dysregulation to inform the LDAII may be useful in identifying SLE patients with renal manifestations who would likely benefit from closer clinical monitoring to prevent the development, morbidity, and early mortality from lupus nephritis and end stage renal disease (ESRD).

Applying Random Forest Machine Learning to Refine LDAII

Figure 6:
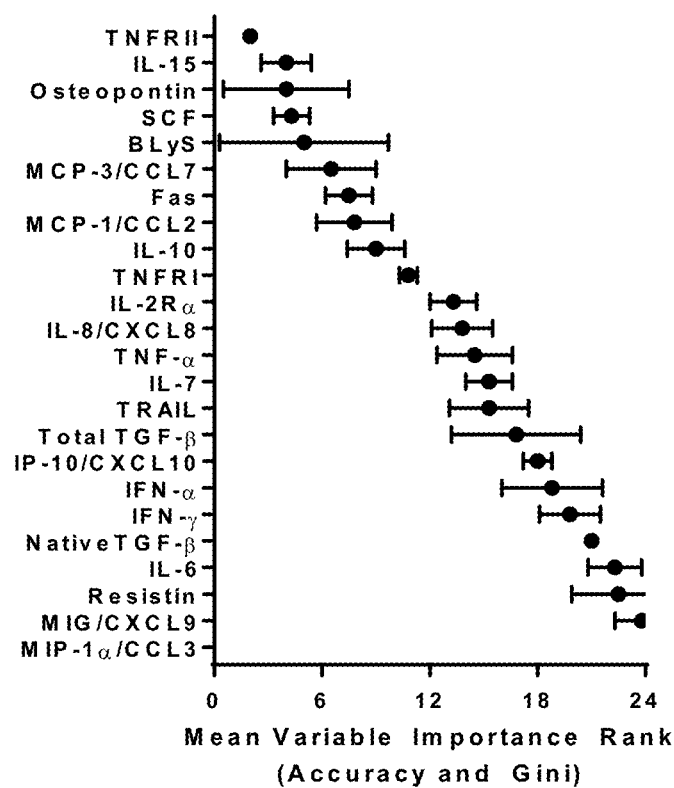
FIG. 6. Random forest variable importance of 24 most informative soluble mediators. Random forest was performed 2000 times utilizing randomly selected ⅔ vs ⅓ splits of data from 24 significant mediators (univariate analyses, Table 4) comparing healthy individuals vs. SLE patients with low vs. active disease. Soluble mediators were assessed in the context of the presence of individual SLE-associated autoantibody specificities as continuous or categorical variables, with composite variable importance ranks (mean±SD) displayed based on accuracy and Gini.
Figure 7:
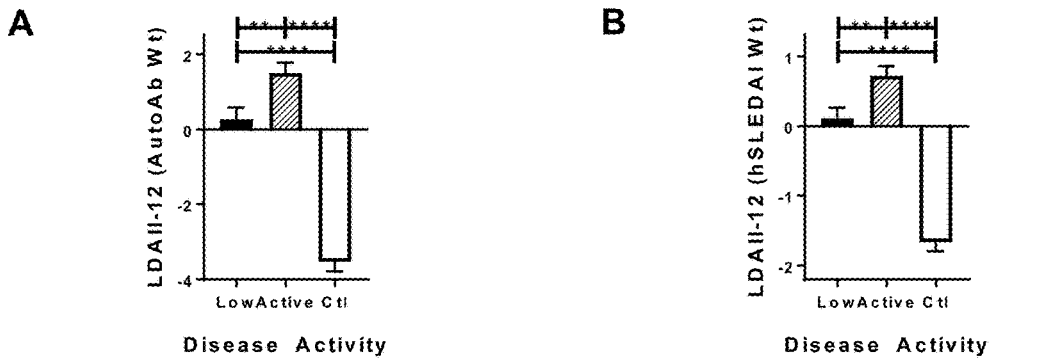
FIG. 7. LDAII, informed by 12 mediators (LDAII-12), weighted either by #AutoAb specificities (A) or hSLEDAI score (B) differentiates SLE patients with low (hSLEDAI<4) or active (hSLEDAI≥4) disease from Ctls. LDAII-12 based on random forest (RF) variable importance rankings comparing Case vs Ctl, Low disease activity SLE vs Ctl, Active disease SLE vs Ctl, and Active vs Low disease SLE. Mean LDAII-12±SEM shown in graphs. p<0.01; **p<0.0001 by Kruskal Wallis with Dunn's Multiple Comparison; $^a$Receiver Operating Characteristic (ROC) curve; AUC=Area under the ROC curve; $^b$Odds Ratio (# of Low vs Active Disease with Positive or Negative LDAII-12); $^c$Fisher's Exact test.

Random forest modeling was applied, comparing case vs. controls, low and active SLE disease activity vs. controls, and low vs. active disease, to determine a composite variable importance ranking based on resulting model accuracy and Gini (homogeneity), FIG. 6. Based on the random forest variable importance rankings, forward selection was applied to the LDAII and determined that the top 12 mediators best informed the LDAII, FIG. 7. The LDAII-12, weighted either by AutoAb accumulation (FIG. 7A) or clinical disease activity (FIG. 7B) significantly discriminated between SLE patients with active vs. low disease activity (p<0.01), as well as SLE patients with active (p<0.0001) or low disease activity (p<0.0001) vs. healthy individuals. Performance of the LDAII-12 was improved over both LDAII-33 and LDAII-24 interactions, with improved AUC in all categories, including differentiating SLE patients with low or active disease from healthy individuals (AUC=0.924, FIG. 7A; AUC=0.912, FIG. 7B), as well as continued significant correlation between the LDAII-12 and hSLEDAI scores in SLE patients (r=0.282, p<0.0001, FIG. 7A; r=0.251, p=0.0060, FIG. 7B). These data suggest that optimal number and type of immune mediators improve the ability of the index to differentiate SLE patients with active disease, as well as SLE patients with low disease activity vs. healthy controls.

Persistently active disease is burdensome for SLE patients, affects quality of life (52) and medical care costs, especially those patients with longstanding disease. Disease activity has been shown to increase over time and the majority of patients with low disease activity will develop active disease that is associated with both organ damage and early mortality and highlights gaps in the optimal management of SLE. The ultimate goal is to move patients toward low disease activity where it has been shown to improve outcomes and prognosis, with fewer organ manifestations and less permanent organ damage, fewer treatments that carry significant side effects and morbidity, and lower mortality.

Recognition and early treatment to prevent tissue and organ damage is challenging, as signs and symptoms of disease activity are captured after their occurrence. In addition, long-term use of steroids and other immune-suppressants required to manage disease activity are associated with increased morbidity. The inability to proactively manage clinical disease limits medical care to reactive treatment, precluding proactive strategies of adding or increasing steroid-sparing immune modifying agents to prevent end-organ damage and reduce the pathogenic and socioeconomic burdens of SLE. Dysregulation of multiple immune pathways, alongside the accumulation of SLE-associated AutoAb specificities, underlies the development and transition to classified SLE. Further, additional immune dysregulation occurs prior to clinical disease flare and the heterogeneity of immune pathway dysregulation and clinical disease could be harnessed by the advent of a lupus flare prediction index. Of interest, this flare index did not inform concurrent clinical disease activity.

Underlying immune dysregulation that reflects ongoing clinical disease activity and harness the information to inform and refine an immune index that complements current clinical disease activity instruments were determined. Within the current study, heterogeneity was observed in the number and type of immune pathways altered in SLE patient samples from active vs. low disease activity. This may explain, in part, the variability among previous reports of inflammatory mediators in SLE patients with active disease, as well as the inconsistent correlations with and limited clinical utility of proposed serologic markers of disease activity, alone or in combination, including anti-dsDNA, complement, complement split products, and inflammatory markers (ESR and CRP). Despite the heterogeneity in immune pathway involvement, each patient demonstrated elevations in inflammatory mediators from at least one pathway. It was not surprising that IFN-associated mediators were affected, including alterations in type I IFN (IFN-α), type II IFN (IFN-γ), and IFN-associated chemokines (IP-10/CXCL10, given the well described IFN signature present in SLE patients. IFN-associated mediators were affected directly in relation to disease activity (low vs. active, clinically/serologically quiescent vs. active), as well as in relation to the presence of SLE-associated AutoAbs, in a subset of patients. This finding is supported by previous studies that indicated that the IFN pathway can reflect disease activity, is dependent on the presence of AutoAbs in a subset of patients, but does not universally explain concurrent clinical disease activity.

Figure 4:
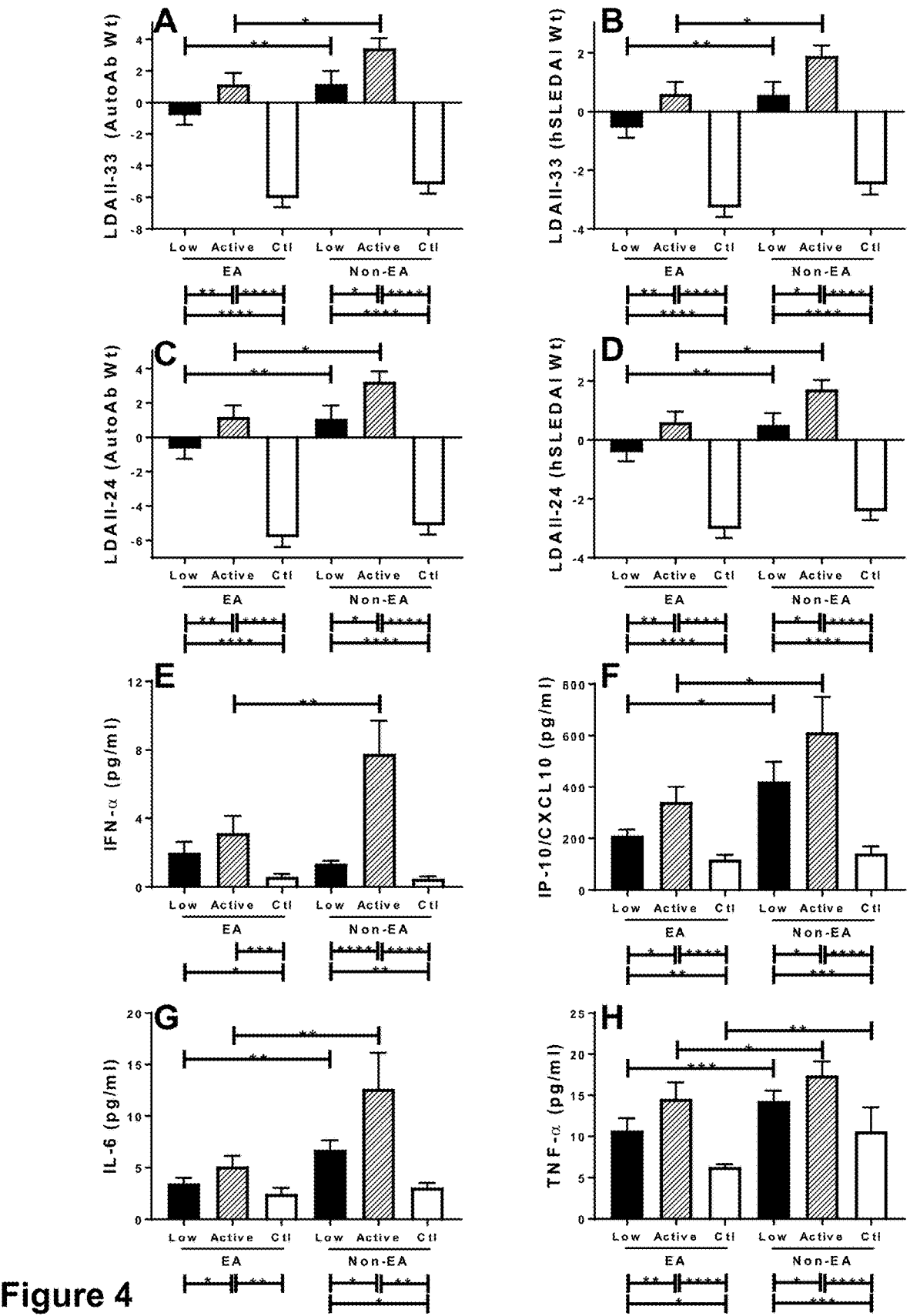
FIG. 4. LDAII informed by 33 mediators (LDAII-33, A-B) and LDAII informed by 24 mediators (C-D) weighted either by #AutoAb specificities (A,C) or hSLEDAI score (B,D) differentiates European American (EA) and non-EA SLE patients and matched healthy individuals (Ctl). Plasma mediators were also compared for these SLE patient/Ctl groups, including IFN-α (E), IP-10/CXCL10 (F), IL-6 (G), and TNF-α (H). Mean±SEM shown in graphs. *p<0.05; p<0.01; *p<0.001; ****p<0.0001 by Kruskal Wallis with Dunn's Multiple Comparison.

There were a number of mediators that did not directly correlate with disease activity measures, yet correlated with the accumulation of AutoAb specificities and were able to differentiate low vs. active disease clinic visits within AutoAb positive vs. negative SLE patients. Notable in this category was the TNF superfamily mediators, BLyS, which contributes to B-lymphocyte activation and AutoAb production. BLyS levels can arise from early dysregulation of type I and type II IFN mediators interacting with the accumulation of lupus-associated autoantibody specificities. BLyS differentiated AutoAb negative vs. positive SLE patients with active disease similarly to IFN-associated mediators (FIGS. 3-4).

A pair of soluble mediators with ostensibly dual anti- and pro-inflammatory functions with respect to lupus disease activity are IL-10 and TGF-β. Both of these mediators have been shown to have regulatory functions and TGF-β levels were negatively correlated with the presence and accumulation of AutoAb specificities, Table 5. Conversely, SLE patients with active disease have increased levels of IL-10 (Table 4). IL-10 has been shown to have pro-inflammatory properties with respect to B-lymphocyte activation and AutoAb production, while TGF-β has been shown to contribute to Th17-type responses in the presence of IL-6 that leads to IL-21 secretion and stimulation of B-lymphocytes that contributes to AutoAb production and SLE pathogenesis.

These immune system changes, in conjunction with lessons learned forming a lupus flare prediction index, have guided us to develop and currently refine a Lupus Disease Activity Immune Index (LDAII) that is informed by soluble mediator alterations and weighted by their correlation with SLE-associated AutoAb accumulation. Time and need for specialized training to minimize variability in disease activity assessment often limit the use of validated SLE disease activity measures in routine clinical practice. The detection of immune system changes associated with ongoing clinical disease activity, harnessed to inform the LDAII, would allow for the identification of patients in need of closer monitoring and enable early intervention with immune modifying treatments to prevent end-organ damage. A positive score would indicate a need for more frequent monitoring and/or a change in medication to tamper ongoing inflammation prior to the onset of new or worsening clinical manifestations. A negative score would indicate maintenance of ongoing monitoring and medication schedules (they are working), the need for less frequent monitoring (particularly if visits occur at least quarterly), and/or consideration of tapering steroids or other immune modifying agents that carry significant side effects. It has been shown that SLE patients who participate more actively in their clinical care have less permanent organ damage. The LDAII would allow patients to monitor their immune activity that precludes clinical disease activity and alert them and their health care providers to the need for further clinical assessment.

Figure 5:
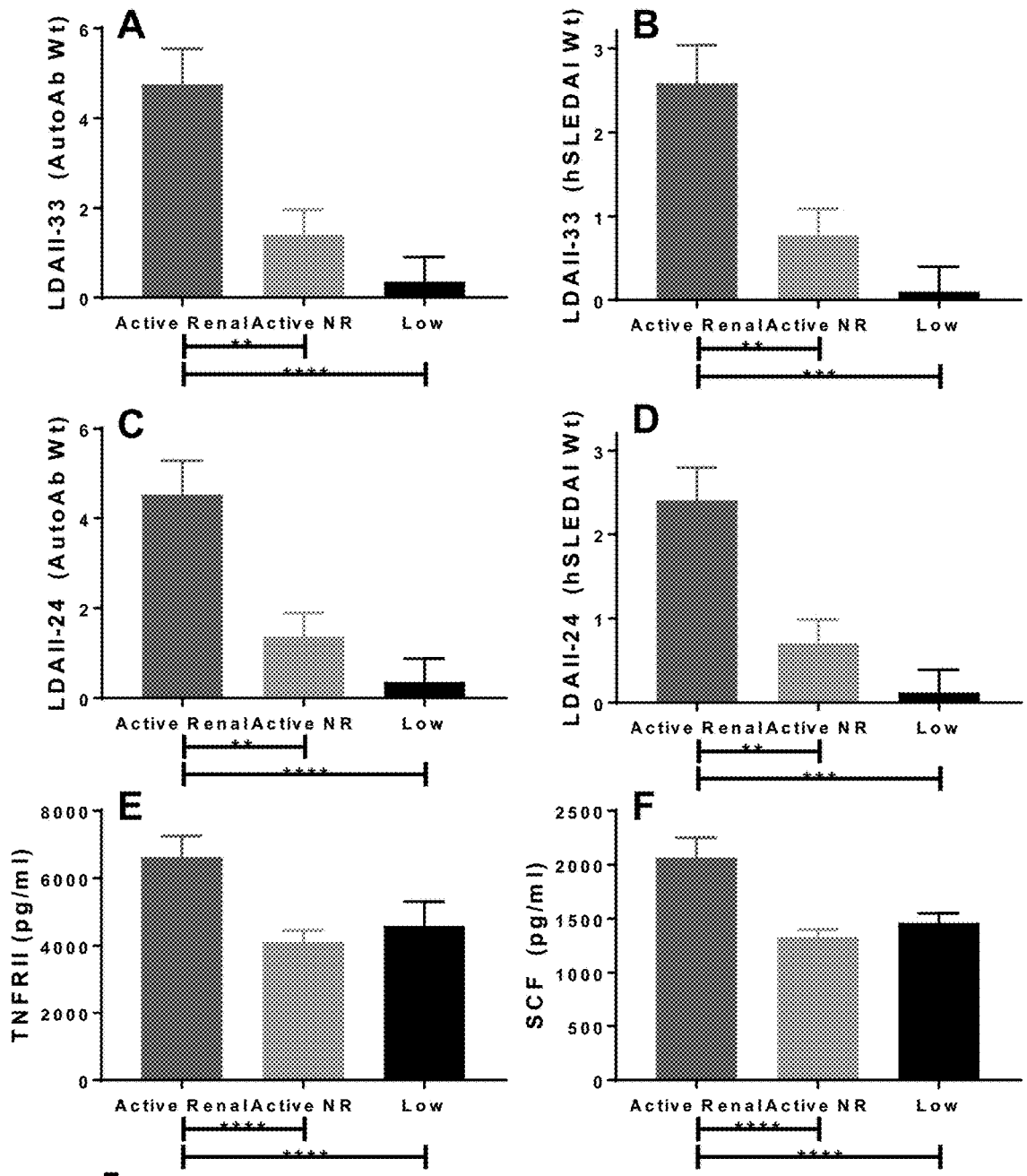
FIG. 5. LDAII informed by 33 mediators (LDAII-33, A-B) and LDAII informed by 24 mediators (C-D) weighted either by #AutoAb specificities (A,C) or hSLEDAI score (B,D) differentiates SLE patients with active disease who have renal or non-renal (NR) clinical criteria vs. SLE patients with low clinical disease activity. Plasma mediators were also compared for these SLE patient groups, including TNFRII (E) and SCF (F). Mean±SEM shown in graphs. p<0.01; *p<0.001; ****p<0.0001 by Kruskal Wallis with Dunn's Multiple Comparison.

Clinically quiescent SLE patients at risk for heightened disease activity and must be regularly monitored. Although SLE patients with active disease were more likely to meet hSLEDAI serologic criteria (increased DNA binding and/or hypocomplementemia) and be positive for anti-dsDNA AutoAbs (Table 3), neither of these factors have been shown to be predictors of heightened clinical disease activity. However, the LDAII was able to differentiate patients with clinically and serologically quiescent (CQSQ) vs. active (CASA) disease (FIG. 3), with a greater difference in IP-10, TNF-α, IL-10, and IL-2Rα levels. In addition, the LDAII was able to differentiate SLE patients with active disease who exhibited renal manifestations (FIG. 5). There is a great push to utilize pathway-specific immune dysregulation to enable personalized, precision medicine for SLE patients with renal manifestations and lupus nephritis (LN). The success of such approaches will require methods for identifying individuals at greatest risk of developing LN and for defining measures of pathway-specific immune dysregulation to select the most appropriate LN patients for a given pathway-specific biologic treatment. Two mediators which are altered in the current assessment of SLE patients with renal involvement are SCF and TNFRII (FIG. 9). SCF and its interaction with the receptor, c-kit, have previously been shown to contribute to kidney damage, including glomerulonephritis and renal failure. TNFRII, normally present on lymphocytes, is aberrantly upregulated in the context of chronic inflammation, including in the kidney, contributing to inflammation, kidney damage and kidney failure.

The ability to detect changes in immune status as a reflection of clinical disease activity would allow for improved disease surveillance and treatment, which could improve patient outcomes and reduce the pathogenic and socioeconomic burdens of SLE. This is particularly true for minority SLE patients, who have increased risk of permanent organ damage early in their disease course, a point that is borne out by enhanced levels of pro-inflammatory mediators and increased LDAII scores in the current study (FIG. 4). An advantage of calculating a patient's LDAII is that it does not require cut-offs for each soluble mediator to establish positivity, and does not require a priori knowledge of the inflammatory pathways that contribute to disease activity in a particular patient. Validating and refining the LDAII in prospective, multiethnic studies would establish a valuable tool in SLE clinical trials and disease management. Depending on the comprehensive clinical picture of an individual patient, early detection of risk for heightened clinical disease activity and organ damage could prompt closer monitoring, preventative treatments, or inclusion in clinical trials for targeted biologics relevant to pathways altered within the LDAII.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described in the context of some embodiments may also be omitted, combined, or replaced by alternative features serving the same, equivalent, or similar purpose without departing from the scope of the invention defined by the appended claims.

What is claimed is:

1. A method for characterizing disease activity in a systemic lupus erythematosus patient (SLE), comprising:
   (a) obtaining a dataset associated with a blood, serum, plasma or urine sample from the patient, wherein the dataset comprises data representing the level of one or more biomarkers in the blood, serum, plasma or urine sample from each of (b) to (g);
   (b) assessing the dataset for a presence or an amount of protein expression of at least three innate serum or plasma mediator biomarkers selected from the group consisting of: interleukin-1 alpha (IL-Iα), interleukin-1 beta (IL-1β), interleukin-1 receptor antagonist (IL-1RA), interferon alpha (IFN-α), interleukin-15 (IL-15), interleukin-12 p70 (IL-12p70), interleukin-6 (IL-6), and interleukin-7 (IL-7);
   (c) assessing the dataset for a presence or an amount of protein expression of at least three adaptive serum or plasma mediator biomarkers selected from the group consisting of: interleukin-2 (IL-2), interleukin-2 receptor alpha chain (IL-2Rα), Interferon gamma (IFN-γ), interleukin-4 (IL-4), interleukin-5 (IL-5), interleukin-13 (IL-13), interleukin-17A (IL-17A), interleukin-10 (IL-10), and transforming growth factor beta (TGF-β);
   (d) assessing the dataset for a presence or an amount of at least one chemokine/adhesion molecule biomarker selected from the group consisting of: interleukin-8 (IL-8), interferon gamma-induced protein (IP-10), monokine induced by gamma interferon (MIG), macrophage inflammatory protein-1 alpha (MIP-Iα), macrophage inflammatory protein-1 beta (MIP-Iβ), macrophage chemoattractant protein-1 (MCP-1), Regulated on Activation, Normal T Cell Expressed and Secreted (RANTES), and macrophage chemoattractant protein-3 (MCP-3);
   (e) assessing the dataset for a presence or an amount of at least two soluble tumor necrosis factor (TNF) superfamily biomarkers selected from the group consisting of: tumor necrosis factor alpha (TNF-α), tumor necrosis factor receptor 1 (TNFRI), tumor necrosis factor receptor 2 (TNFRII), Fas receptor (Fas), B lymphocyte stimulator (BLyS), and TNF-related apoptosis-inducing ligand (TRAIL);

(f) assessing the dataset for a presence or an amount of at least one inflammatory mediator biomarker selected from the group consisting of Osteopontin (OPN), Stem Cell Factor (SCF), and Resistin;

(g) assessing the dataset for a presence or an amount at least seven six SLE-associated autoantibody specificity biomarkers selected from the group consisting of: double-stranded DNA (dsDNA), chromatin, ribosomal P protein (RiboP), Sm protein (Sm), Ribonucleoprotein (RNP), and Sm/RNP common motif (SmRNP);

(h) calculating a Lupus Disease Activity Immune Index (LDAII) score; and (i) administering a treatment to the patient after determining, based on the LDAII score, that the patient has the prognosis for active disease, wherein the treatment comprises at least one of: hydroxychloroquine (HCQ), belimumab, a nonsteroidal anti-inflammatory drug, or a steroid.

2. The method of claim 1, wherein at least 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, or 43 biomarkers are used in the calculation of the LDAII.

3. The method of claim 1, wherein the dataset is: log transformed; standardized; weighted by Spearman r correlation to the autoantibody specificities in a second dataset, and a summation of the protein markers of (b), (c), (d), (e) and (f) equals an LDAII score.

4. The method of claim 1, wherein the dataset is: log transformed; standardized; weighted by Spearman r correlation to the hybrid Systemic Lupus Erythematosus Disease Activity Index (hSLEDAI) in a second dataset, and a summation of the protein markers of (b), (c), (d), (e) and (f) equals an LDAII score.

5. The method of claim 1, wherein obtaining the dataset comprises performing at least one immunoassay, where performing the immunoassay comprises:
obtaining the blood, serum, plasma, or urine sample that comprises the biomarkers;
contacting the blood, serum, plasma, or urine sample with a plurality of distinct reagents;
generating a plurality of distinct complexes between the reagents and biomarkers; and
detecting the complexes to generate the data.

6. The method of claim 5, wherein the at least one immunoassay comprises a multiplex assay.

7. The method of claim 1, wherein the LDAII divides a level of severity or progression of the SLE into clinically active (CA) or quiescent (CQ) disease that is either serologically (dsDNA binding and low complement) active (SA) or serologically quiescent (SQ).

8. The method of claim 1, wherein a positive LDAII score indicates prognosis for active disease, and a negative LDAII score indicates prognosis for low disease activity.

9. A method of evaluating disease activity and progression of Systemic Lupus Erythematosus (SLE) clinical disease in a patient comprising:
obtaining a blood, serum, plasma or urine sample from the patient;
performing at least one immunoassay on a sample from the patient to generate a dataset comprising at least three biomarkers from each of (1) to (6):
(1) assessing the dataset for a presence or an amount of protein expression of at least three innate serum or plasma mediator biomarkers selected from the group consisting of: interleukin-1 alpha (IL-Iα), interleukin-1 beta (IL-1β), interleukin-1 receptor antagonist (IL-1RA), interferon alpha (IFN-α), interleukin-15 (IL-15), interleukin-12 p70 (IL-12p70), interleukin-6 (IL-6), and interleukin-7 (IL-7);

(2) assessing the dataset for a presence or an amount of protein expression of at least three adaptive serum or plasma mediator biomarkers selected from the group consisting of: interleukin-2 (IL-2), interleukin-2 receptor alpha chain (IL-2Rα), Interferon gamma (IFN-γ), interleukin-4 (IL-4), interleukin-5 (IL-5), interleukin-13 (IL-13), interleukin-17A (IL-17A), interleukin-10 (IL-10), and transforming growth factor beta (TGF-β);

(3) assessing the dataset for a presence or an amount of at least one chemokine/adhesion molecule biomarker selected from the group consisting of: interleukin-8 (IL-8), interferon gamma-induced protein (IP-10), monokine induced by gamma interferon (MIG), macrophage inflammatory protein-1 alpha (MIP-Iα), macrophage inflammatory protein-1 beta (MIP-Iβ), macrophage chemoattractant protein-1 (MCP-1), Regulated on Activation, Normal T Cell Expressed and Secreted (RANTES), and macrophage chemoattractant protein-3 (MCP-3);

(4) assessing the dataset for a presence or an amount of at least two soluble tumor necrosis factor (TNF) superfamily biomarkers selected from the group consisting of: tumor necrosis factor alpha (TNF-α), tumor necrosis factor receptor 1 (TNFRI), tumor necrosis factor receptor 2 (TNFRII), Fas receptor (Fas), B lymphocyte stimulator (BLyS), and TNF-related apoptosis-inducing ligand (TRAIL);

(5) assessing the dataset for a presence or an amount of at least one inflammatory mediator biomarker selected from the group consisting of Osteopontin (OPN), Stem Cell Factor (SCF), and Resistin; and (6) assessing the dataset for a presence or an amount at least six SLE-associated autoantibody specificity biomarkers selected from the group consisting of: double-stranded DNA (dsDNA), chromatin, ribosomal P protein (RiboP), Sm protein (Sm), Ribonucleoprotein (RNP), and Sm/RNP common motif (SmRNP);

(7) calculating a Lupus Disease Activity Immune Index (LDAII) score; and (8) administering a treatment to the patient after determining, based on the LDAII score, that the patient has the prognosis for active disease, wherein the treatment comprises at least one of: hydroxychloroquine (HCQ), belimumab, a nonsteroidal anti-inflammatory drug, or a steroid.

10. The method of claim 9, wherein at least 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, or 43 biomarkers are used in the calculation of the LDAII.

11. The method of claim 9, wherein the dataset is: log transformed; standardized; weighted by Spearman r correlation to the autoantibody specificities in a second dataset, and a summation of the protein markers of (1), (2), (3), (4) and (5) equals a Lupus Disease Activity Immune Index (LDAII) score.

12. The method of claim 9, wherein the dataset is: log transformed; standardized; weighted by Spearman r correlation to the hybrid Systemic Lupus Erythematosus Disease Activity Index in a second dataset, and a summation of the protein markers of (1), (2), (3), (4) and (5) equals a Lupus Disease Activity Immune Index (LDAII) score.

13. The method of claim 9, wherein performing the at least one immunoassay comprises:
    contacting the blood, serum, plasma, or urine sample with a plurality of distinct reagents;
    generating a plurality of distinct complexes between the reagents and biomarkers; and
    detecting the complexes to generate the data.

14. The method of claim 13, wherein the at least one immunoassay comprises a multiplex assay.

15. The method of claim 9, wherein the LDAII divides a level of severity or progression of the SLE into clinically active (CA) or quiescent (CQ) disease that is either serologically (dsDNA binding and low complement) active (SA) or serologically quiescent (SQ).

16. The method of claim 9, wherein a positive LDAII score indicates prognosis for active disease, and a negative LDAII score indicates prognosis for low disease activity.

17. The method of claim 9, wherein obtaining the dataset associated with the sample comprises obtaining the sample and processing the sample to experimentally determine the dataset, or wherein obtaining the dataset associated with the sample comprises receiving the dataset from a third party that has processed the sample to experimentally determine the dataset.

18. The method of claim 9, wherein an increase in the SCF, TNFRII, and MCP-I biomarkers are indicative of renal organ involvement.

* * * * *